(12) United States Patent
McInnes et al.

(10) Patent No.: US 6,244,108 B1
(45) Date of Patent: Jun. 12, 2001

(54) WHEEL BALANCER

(75) Inventors: Duncan W McInnes, Limerick; Padraig Fogarty, Ballina; Paul P Meaney, Shannon; Richard J Cullen, Killaloe, all of (IE)

(73) Assignee: Snap-On Equipment Europe Limited, County Clare (GB)

( * ) Notice: Subject to any disclaimer, the term of this patent is extended or adjusted under 35 U.S.C. 154(b) by 0 days.

(21) Appl. No.: 09/254,471

(22) PCT Filed: Sep. 8, 1997

(86) PCT No.: PCT/IE97/00062

§ 371 Date: May 6, 1999

§ 102(e) Date: May 6, 1999

(87) PCT Pub. No.: WO98/10261

PCT Pub. Date: Mar. 12, 1998

(30) Foreign Application Priority Data

Sep. 6, 1996 (IE) .................................. S960630

(51) Int. Cl.[7] .................................. G01M 1/32
(52) U.S. Cl. .......................... 73/462; 301/5.21
(58) Field of Search ................. 73/462, 460, 466, 73/467; 356/139.09; 301/5.21

(56) References Cited

U.S. PATENT DOCUMENTS 5,054,918  10/1991  Downing et al. ............... 356/152
5,827,964  * 10/1998  Douine et al. ................... 73/466

FOREIGN PATENT DOCUMENTS 3308835  9/1984 (DE) .
0 565 320  10/1993 (EP) .
2 674 331  9/1992 (FR) .
56-157829  12/1981 (JP) .

\* cited by examiner

Primary Examiner—John E. Chapman
(74) Attorney, Agent, or Firm—Sughrue, Mion, Zinn, Macpeak & Seas, PLLC

(57) ABSTRACT

A wheel balancer (1) for balancing an alloy wheel (2) comprises a support housing (30) and a main shaft (36) onto which the wheel (2) is mounted. A sub-housing (35) rotatably carries the main shaft (36), imbalance forces in the main shaft (36) and their respective directions are monitored for determining the magnitude and angular positions of balance weights required for correcting imbalances in the wheel (2) in selected balancing planes (17) and (18). A telescoping extendible sensor arm (54) is pivotally mounted about a vertical pivot axis on the support housing (30) for detecting balance weight receiving locations on the inner surface (10) of a wheel hub (4) of the wheel (2) at the selected desired balancing planes (17) and (18). Balance weight positions (22) at which correcting balance weights (20) are to be attached to the inner surface (10) of the wheel hub (4) in the respective balancing planes (17) and (18) are indicated by a laser light source (70) which directs a pencil laser beam (72) at the inner surface (10) in the lower front quadrant (23) of the wheel hub (4) when the balance weight position (22) is aligned with the laser light source (70). A laser light dot formed on the inner surface (10) indicates the angular center line (21) of the balance weight position (22) and an inner side edge (25) of the balance weight position thereby indicating to the operator the precise position at which the correcting balance weight (20) is to be attached to the wheel hub.

27 Claims, 19 Drawing Sheets

WHEEL BALANCER

Figure 1:
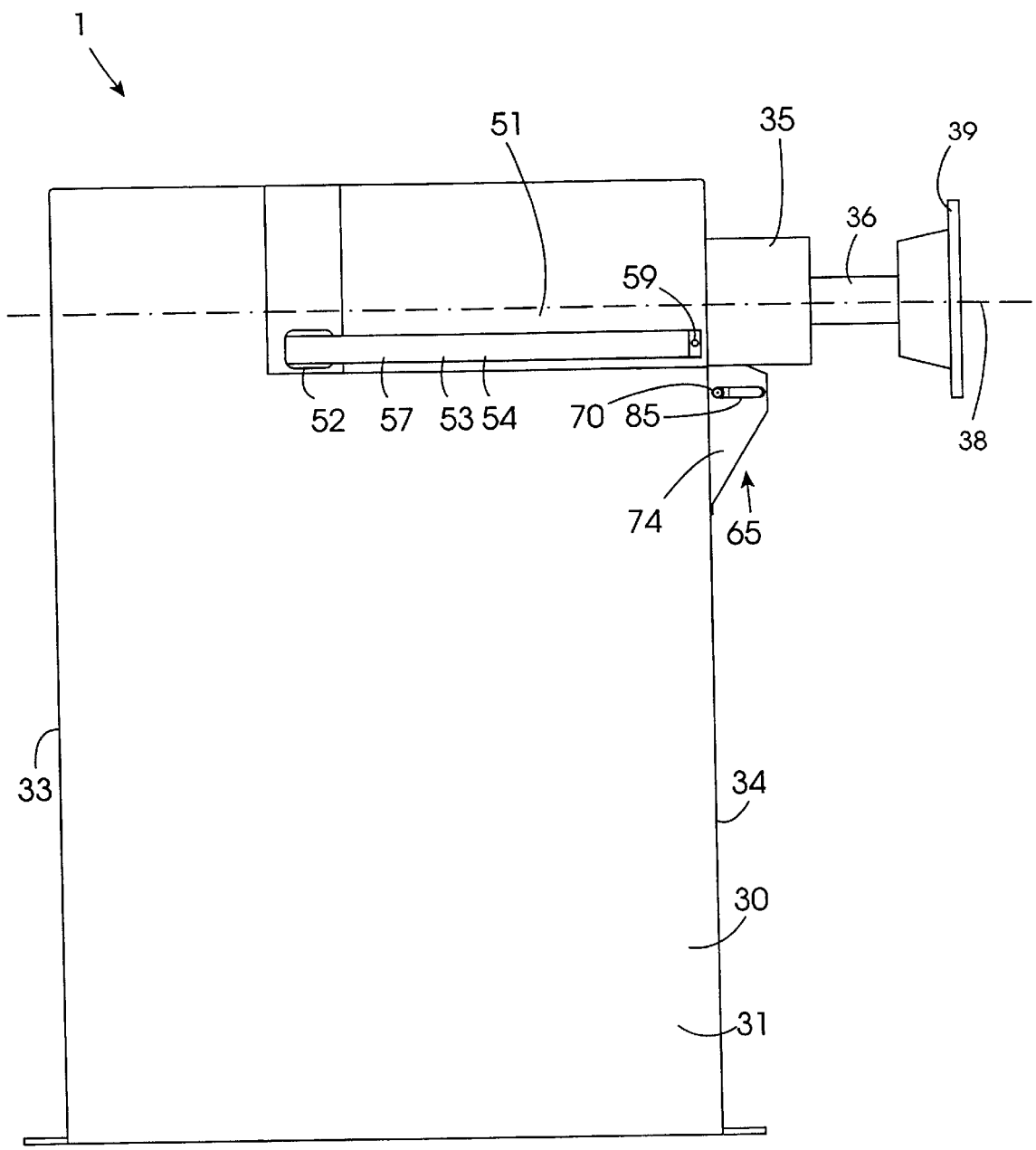

The present invention relates to a wheel balancer, and in particular, though not limited to a wheel balancer for balancing an alloy vehicle wheel, and in which balance weights, are, in general, attached to the inner surface of the portion of the wheel hub which defines the wheel well. In general, such weights are secured to the wheel well by an adhesive, and typically, are located on the inner side of the wheel, in other words, on the inner side relative to the spokes of the wheel, out of sight when the wheel is attached to a vehicle for aesthetic purposes.

Wheel balancers for balancing wheels are well known, and in general, fall into two categories, namely, dynamic and static balancers. Dynamic balancers fall into two sub-categories, namely, slow speed and high speed balancers. In slow speed dynamic balancers, the wheel is mounted on a main shaft of the balancer, and in general, is rotated by hand. In high speed dynamic balancers, the main shaft onto which the wheel is attached, in general, is rotated by a drive motor. The present invention while in general, it relates to a dynamic wheel balancer, also relates to a static wheel balancer, and as a dynamic wheel balancer may be a high speed or a low speed balancer.

In the balancing of alloy wheels, it is important for aesthetic purposes that the balance weights should be attached to the alloy wheel hub out of sight when the wheel is attached to a vehicle. For this and other reasons, clip-on weights of the type which are typically attached to the inner and outer rims of steel wheel hubs are unsuitable for balancing alloy wheels. Weights which are generally used in balancing alloy wheels are referred to as stick-on weights, and are provided with a self-adhesive coating for bonding the weight to an inner surface of the wheel hub, which defines a wheel well. Typically, the weights are attached to the surface defining the well at locations in two spaced apart balancing planes which are located between the spokes of the wheel hub and the inner rim of the wheel hub, in other words, on the inner side of a plane defined by the spokes of the wheel hub. In this way, when the wheel is attached to the vehicle the weights, in general, are largely out of sight. The balancing planes are axially spaced apart relative to the axis of rotation of the wheel, and preferably, the balancing planes are spaced apart a distance of at least 50 mm. In wide rim wheels the spacing between the balancing planes, in general, is considerably greater.

Since, in general, there are no markings or identifications which would identify the balancing planes on alloy wheel hubs, great care is required when the balance weights are being attached to the wheel hub. Indeed, even with great care, in general, it is difficult to accurately locate the balance weights, and in particular, it is difficult to accurately locate the balance weights in an axial direction relative to the rotational axis of the alloy wheel. Wheel balancers are known which comprise an arm for applying balance weights in the appropriate positions in the balancing planes in the wheel hub. In such wheel balancers, each balance weight is placed in a clamp at a free end of the arm which is then extended until the balance weight in the clamp co-incides with the balancing plane. Such wheel balancers are relatively complex, expensive and are not always accurate, and in general, require special purpose balance weights.

The present invention is directed towards providing a wheel balancer which overcomes these problems, and to a method for using a wheel balancer for overcoming the problems.

According to the invention there is provided a wheel balancer for measuring imbalance in a vehicle wheel in a balancing plane normal to the axis of rotation of the vehicle wheel, and for indicating the position on the wheel at which a balance weight is to be located for correcting the imbalance, the wheel balancer comprising a support means, a main shaft rotatable about a rotational axis in the support means, a receiving means located on the main shaft for receiving the vehicle wheel with the axis of rotation of the vehicle wheel co-axial with the rotational axis of the main shaft, a sensing means for detecting the balancing plane of the vehicle wheel and a balance weight receiving location adjacent the balancing plane, and for generating signals representative of the position of the balancing plane along the rotational axis relative to a reference plane and the radius of the balance weight receiving location adjacent the balancing plane, a monitoring means for monitoring rotation of the main shaft and for generating signals representative of the magnitude and angular direction of imbalance forces in the main shaft, a computing means for computing the magnitude of a correcting balance weight and the angular position of the balance weight to be located at the balance weight receiving location in the balancing plane for correcting the imbalance in response to signals generated by the sensing means and the monitoring means, and a position indicating means responsive to the computing means for indicating the angular position relative to the wheel axis at which the correcting balance weight is to be located, wherein the position indicating means indicates a balance weight position in the balance weight receiving location adjacent the balancing plane at which the correcting balance weight is to be located, the angular position of the balance weight position and its position relative to the reference plane being indicated by the position indicating means, and the position indicating means indicates the balance weight position by means of a visually perceptible indication on the wheel.

The advantages of the invention are many. One particularly important advantage of the invention is achieved by virtue of the fact that the position indicating means indicates the balance weight position by means of a visually perceptible indication on the wheel. Since the indication is a visually perceptible indication, it can readily easily be identified by an operator, and the balance weight can be accurately located by the operator in the balance weight position.

Preferably, the indicating means is adapted for indicating the balance weight position when the wheel is in a rotational position such that the balance weight position is located in a position which is accessible to the operator. The advantage of this feature of the invention is that it allows ready access to the operator to the balance weight position.

Advantageously, the indicating means is adapted for indicating the balance weight position when the rotational position of the wheel is such that the balance weight position is located in a position which is visually accessible to the operator. The advantage of this feature of the invention is that it significantly increases the accuracy with which the balance weight position can be identified by the operator, and also the accuracy with which the correcting balance weight can be attached to the wheel.

Ideally, the rotational axis defined by the main shaft extends horizontally, and the position indicating means is adapted for indicating the balance weight position when the balance weight position is located in a lower half of the wheel relative to the main shaft. The advantage of this feature of the invention is that it further enhances access by the operator to the balance weight position, thus further enhancing the accuracy and ease with which a correcting balance weight can be attached to the wheel at the balance weight position.

In one embodiment of the invention, the position indicating means is adapted for indicating the balance weight position when the balance weight position lies in a position at an angle in the range of ±30° to ±80° from bottom dead centre of the wheel. Preferably, the position indicating means is adapted for indicating the balance weight position when the balance weight position lies in a position at an angle in the range of ±45° to ±75° from bottom dead centre of the wheel. Advantageously, the position indicating means is adapted for indicating the balance eight position when the balance weight position lies in a position at an angle in the range of ±57° to ±71° from bottom dead centre of the wheel.

In another embodiment of the invention, the support means defines a front face, a rear face and a side face of the wheel balancer, the side face extending between the front face and the rear face thereof, and the main shaft extending outwardly from the side face of the support means between the front and rear faces, so that in use an operator normally operates the wheel balancer from a position in front of the front face thereof, and the position indicating means indicates the balance weight position when the balance weight position is located in a lower front quadrant of the wheel relative to the main shaft and the support means. By indicating the balance weight position when the balance weight position is located in a lower front quadrant of the wheel relative to the main shaft and the support means, an operator standing in a normal operating position in front of the wheel balancer can readily easily see the indicated balance weight position, and in turn readily easily, and in particular, accurately locate and secure a correcting balance weight in the indicated balance weight position. Furthermore, by indicating the balance weight position in the lower front quadrant of the wheel, when the balance weight position is located on the inner surface of a wheel hub which defines the wheel well, the balance weight position is viewed from above by the operator, and the operator can apply the correcting balance weight without having to bend or to look upwardly, and furthermore, the operator can fix the balance weight with a downward pressure, which can readily easily be applied, and can be applied significantly more easily than if an upward pressure had to be applied.

Preferably, the support means and the main shaft are located relative to each other for providing easy access by an operator to the balance weight position when the balance weight position is indicated by the position indicating means.

In one embodiment of the invention, the position indicating means indicates the centre line of the balance weight position parallel to the rotational axis of the main shaft, and advantageously, the position indicating means indicates a circumferential side edge of the balance weight position. Preferably, the position indicating means indicates the circumferential side edge of the balance weight position which is adjacent the support means. This allows the operator to see the balance weight position indicated by the position indicating means while the balance weight is being located and attached to the balance weight position.

In one embodiment of the invention, the position indicating means indicates two balance weight positions on the wheel adjacent respective axially spaced apart balancing planes for dynamic balancing of the wheel.

Preferably, the position indicating means is a non-contact indicating means. Advantageously, the position indicating means comprises a light source which projects a light beam for indicating each balance weight position, and ideally, the position indicating means projects a pencil light beam for indicating each balance weight position.

Preferably, the light source is a laser light source, and ideally, the light source projects a dot of light onto the balance weight receiving location for indicating each balance weight position, and preferably, projects a point dot of light for accurately indicating each balance weight position.

Ideally, the position indicating means is powered up to project the light beam only when the wheel has been rotated into a position with the respective balance weight positions located in the position which is accessible to the operator, and preferably, the position indicating means is powered up to project the light beam only for so long as each balance weight position remains located in the position which is accessible to the operator.

In one embodiment of the invention, the position indicating means is pivotally mounted for pivoting in a single plane for indicating each balance weight position, and a drive means is provided for pivoting the position indicating means in the single plane in response to the computing means. Preferably, the position indicating means is pivotal about a substantially vertically extending pivot axis. Ideally, the position indicating means is pivotal in a horizontal plane for projecting and sweeping the light beam through an arc in the horizontal plane below the main shaft, and preferably, the position indicating means is located below a horizontal plane containing the rotational axis of the main shaft.

In another embodiment of the invention, the position indicating means is mounted towards the rear face of the support means between a vertical plane containing the rotational axis of the main shaft and the rear face of the support means and the position indicating means directs the light beam outwardly of the side face of the support means in a generally sideward forward direction relative to the support means, and preferably, the position indicating means is mounted adjacent the side face of the support means.

In one embodiment of the invention, the sensing means is a non-contact sensing means and co-operates with the position indicating means for detecting each balancing plane of the vehicle wheel and the balance weight receiving location adjacent each balancing plane, the position indicating means being movable for directing the light beam at the wheel so that the beam strikes the wheel at the balance weight receiving location adjacent each balancing plane, so that a dot of light from the light beam projected onto each balance weight receiving location is detectable by the sensing means, and a feedback means is provided for feeding back to the computing means signals representative of the position of the position indicating means when the beam strikes the wheel at the balance weight receiving location in each balancing plane, so that the combination of signals generated by the sensing means and the feedback means are representative of the position of each balancing plane along the rotational axis relative to the reference plane and the radius of the balance weight receiving location adjacent each balancing plane. This feature facilitates particularly accurate determination of the position of each selected balancing plane and the radius of the balance weight receiving location adjacent the balancing plane.

In another embodiment of the invention, the position indicating means and the sensing means are mounted at spaced apart locations on a mounting means, the mounting means being movable for moving the position indicating means for directing the beam to the wheel at the balance weight receiving location in each balancing plane for facilitating detecting of the balance weight receiving location in each balancing plane by the sensing means.

Preferably, the sensing means is a charge coupled integrated opto sensor, and is mounted on the mounting means for scanning an arc on the wheel adjacent the balance weight receiving location adjacent each balancing plane, the position indicating means being mounted on the mounting means for directing the beam to strike the wheel within the arc scanned by the sensing means for facilitating detection of the balance weight receiving location in each balancing plane by the sensing means.

Advantageously, the sensing means and the position indicating means are fixedly mounted on the mounting means. In another embodiment of the invention, the opto sensor generates a signal which is representative of the position in the scanning arc at which the dot of light formed by the light beam is detected on the wheel for facilitating computing by the computing means by triangulation of the position and radius of each balance weight receiving location.

Preferably, the mounting means is pivotally mounted for defining the pivot axis of the position indicating means about which the position indicating means pivots for indicating each balance weight position.

Alternatively, the sensing means is a contact sensing means.

In one embodiment of the invention, the sensing means comprises an extendible sensor arm which is connected to the support means and is extendible for engaging the wheel adjacent the balance weight receiving location adjacent each balancing plane.

In another embodiment of the invention, the sensor arm is a telescoping sensor arm and is pivotally connected to the support means and is pivotal in one plane only.

In a further embodiment of the invention, the sensor arm is pivotal in a horizontal plane.

Preferably, the sensing means further comprises a first signal generating means for generating a signal representative of the distance by which the sensor arm is extended from a rest position for engaging the wheel at the balance weight receiving location adjacent each balancing plane, and a second signal generating means for generating a signal representative of the angular displacement of the sensor arm from the rest position for engaging the wheel at the balance weight receiving location adjacent each balancing plane.

In a further embodiment of the invention, the position indicating means indicates each balance weight position on an inner surface of a wheel hub of the wheel which defines a wheel well.

In one embodiment of the invention, the wheel balancer is adapted for balancing an alloy wheel in which the wheel hub is an alloy wheel hub.

In another embodiment of the invention, the position indicating means indicates each balance weight position in the wheel well at a location which lies axially between an inner rim of the wheel hub and spokes of the wheel hub.

Additionally, the invention provides a method using a wheel balancer for measuring imbalance in a vehicle wheel in a balancing plane normal to the axis of rotation of the vehicle wheel, the method comprising the steps of attaching the vehicle wheel to a receiving means which is located on a main shaft of the wheel balancer, which in turn is rotatably supported in a support means, the axis of rotation of the vehicle wheel coinciding with the rotational axis of the main shaft, detecting by means of a sensing means of the wheel balancer the balancing plane and a balance weight receiving location adjacent the balancing plane at which a correcting balance weight is to be attached, and generating signals by the sensing means which are representative of the position of the balancing plane along the rotational axis of the main shaft relative to a reference plane and the radius of the balance weight receiving location, monitoring rotation of the main shaft by a monitoring means, and generating signals by the monitoring means which are representative of the magnitude and angular direction of the imbalance forces in the main shaft, computing by means of a computing means from signals received from the sensing means and the monitoring means the magnitude of a correcting balance weight and the angular position at which the balance weight is to be located at the balance weight receiving location adjacent the balancing plane for correcting the imbalance, and indicating by means of a position indicating means in response to signals received from the computing means the angular position at which the correcting balance weight is to be located, wherein a balance weight position in the balance weight receiving location adjacent the balancing plane is indicated by the position indicating means, the angular position of the balance weight position and its position relative to the reference plane being indicated by the position indicating means, and the balance weight position is indicated by the position indicating means by means of a visually perceptible indication on the wheel.

Preferably, the balance weight position is indicated by the position indicating means when the wheel is in a rotational position such that the balance weight position is located in an accessible position to the operator of the wheel balancer.

Advantageously, the balance weight position is indicated by the position indicating means when the wheel is in a rotational position such that the balance weight position is located in a visually accessible position to the operator of the wheel balancer.

Ideally, the balance weight position is indicated by the position indicating means when the balance weight position is located facing upwardly rearwardly relative to the support means of the wheel balancer.

Figure 2:
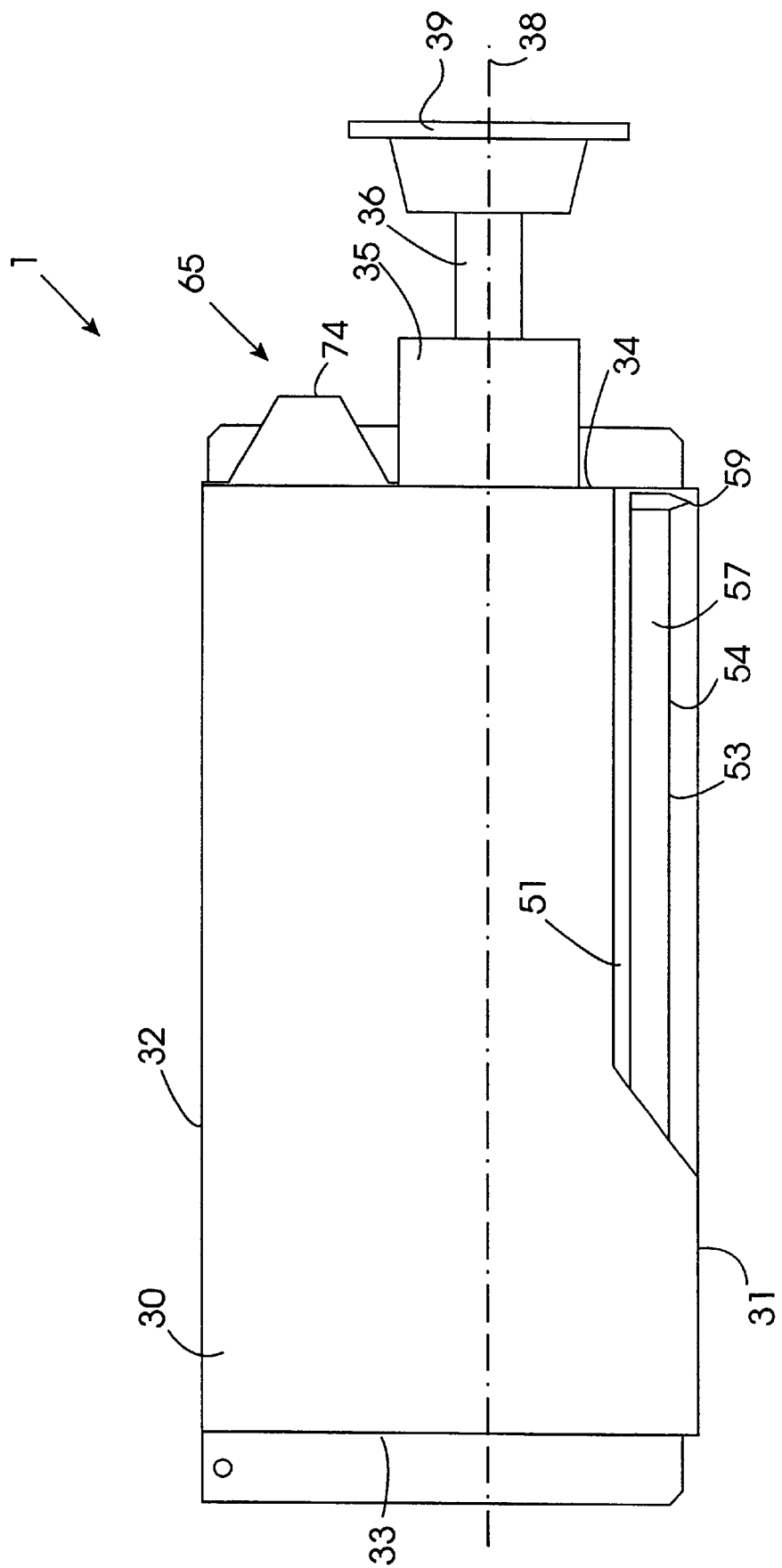
Figure 3:
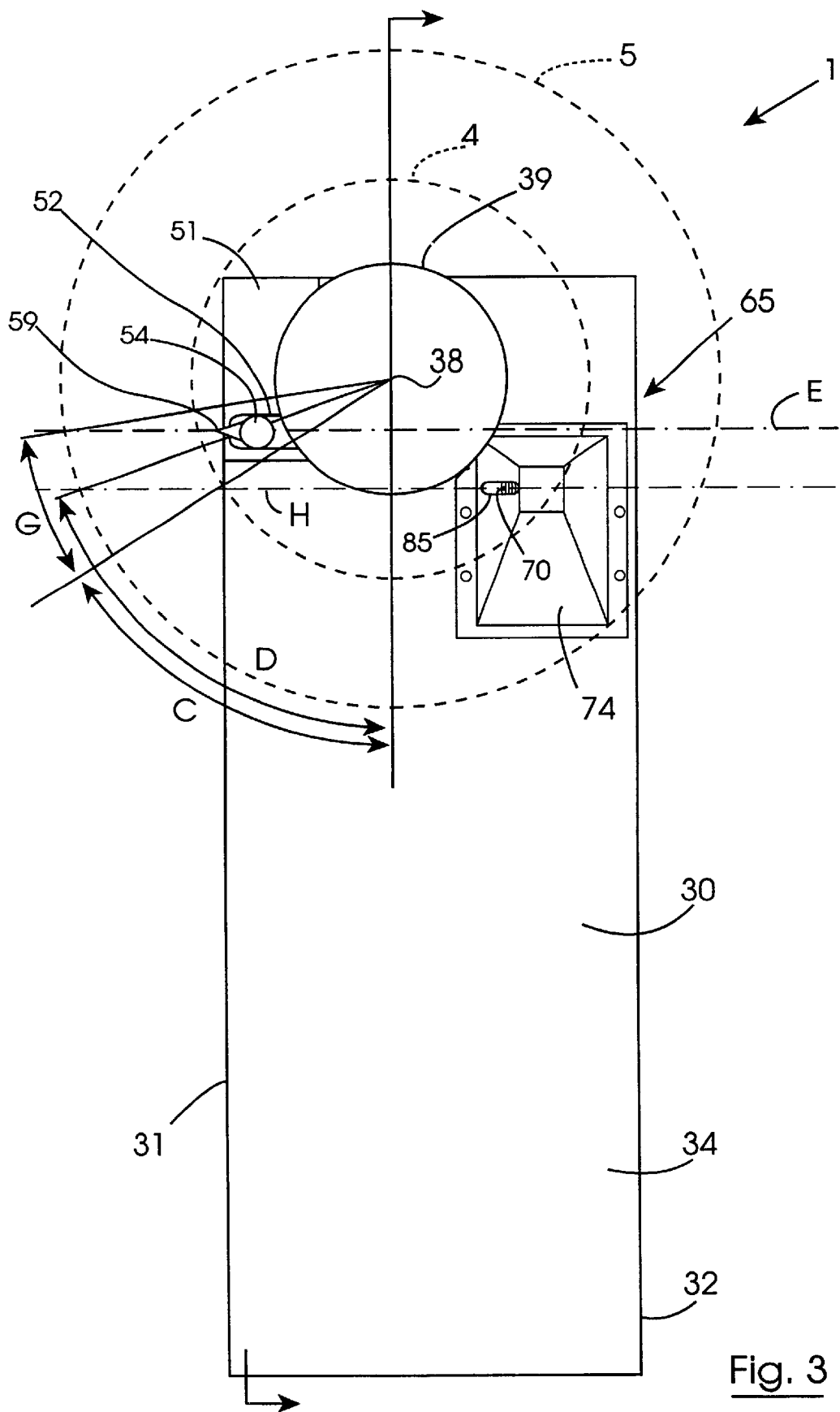
Figure 4:
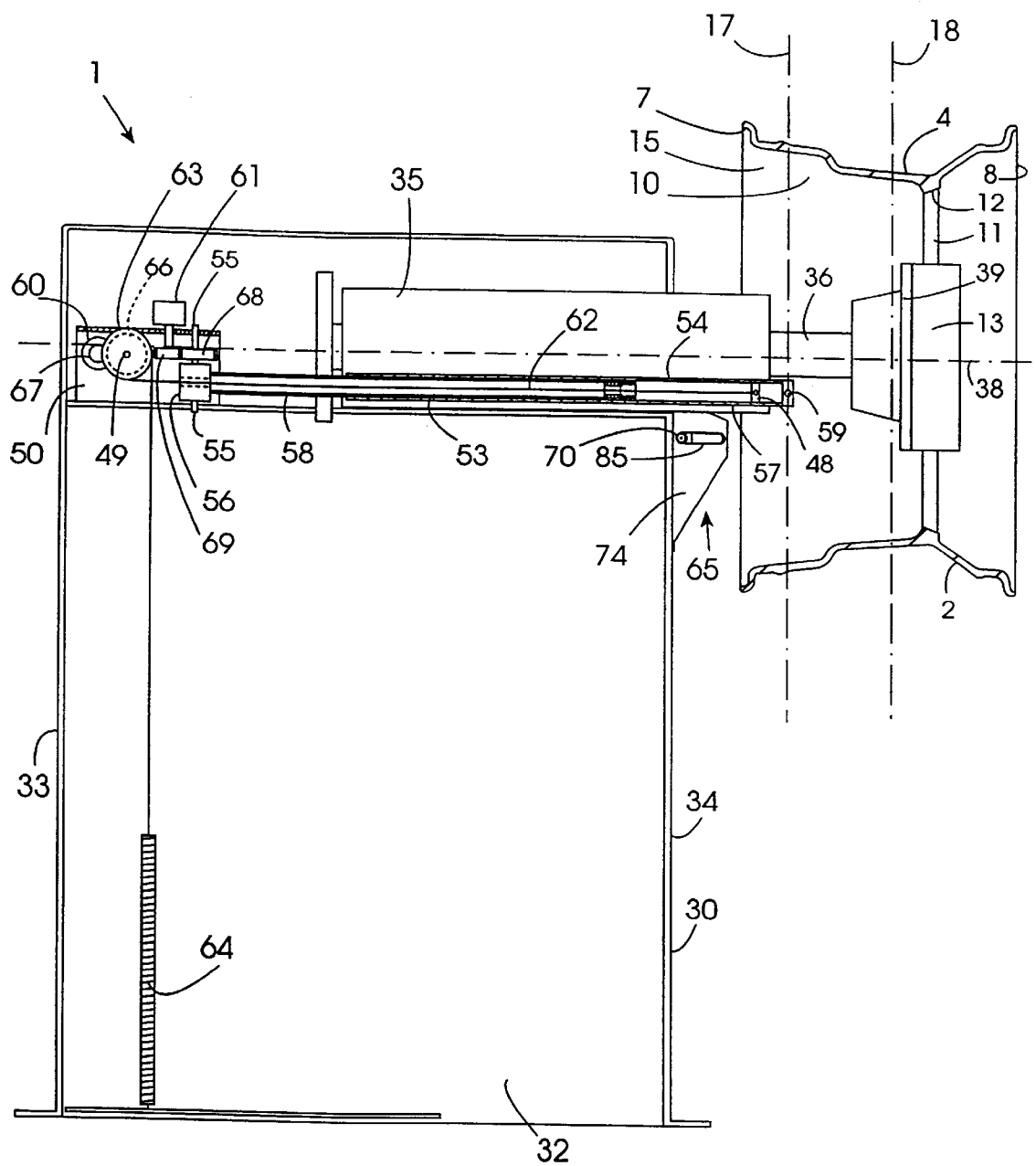
Figure 5:
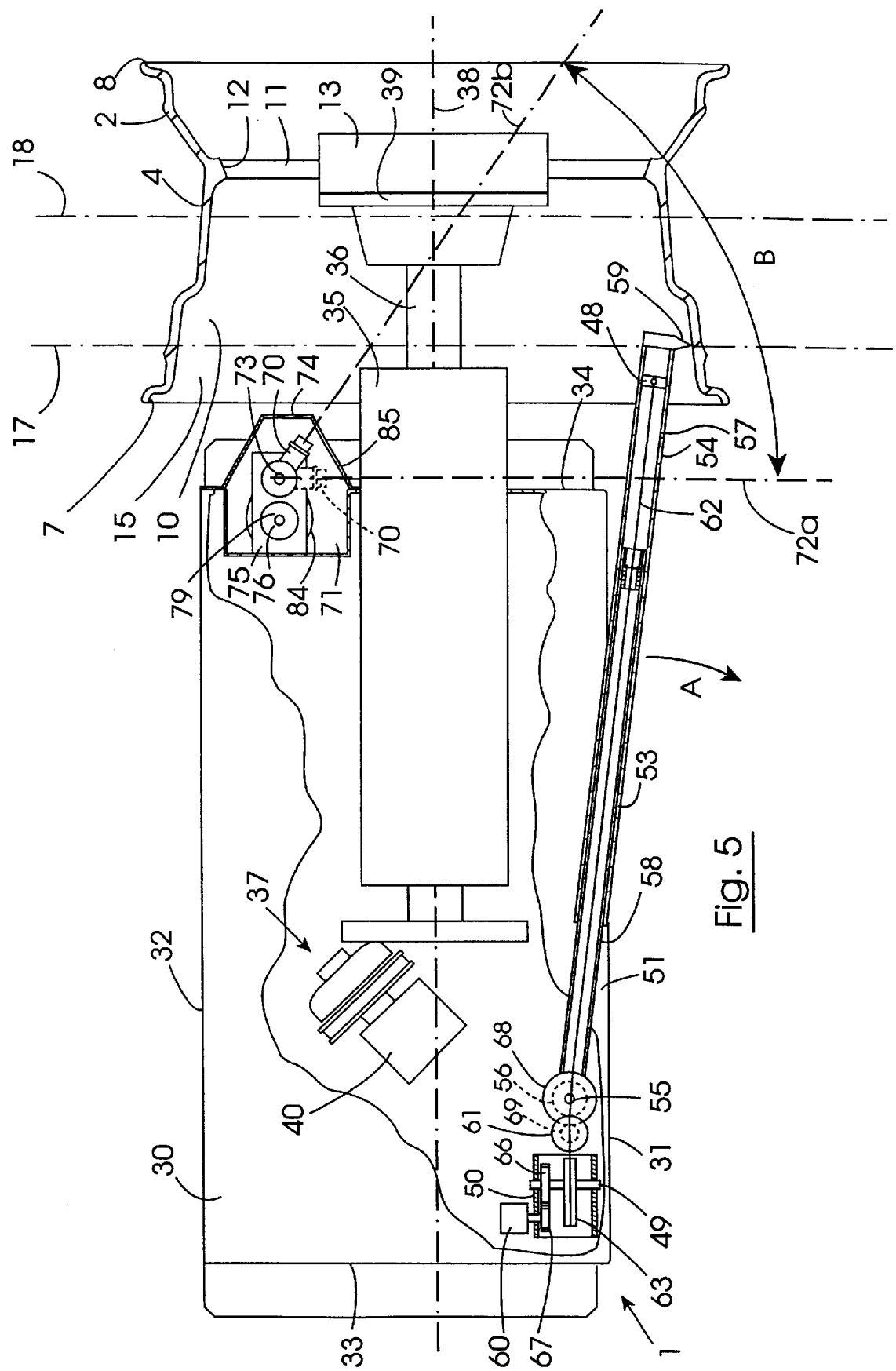
Figure 6:
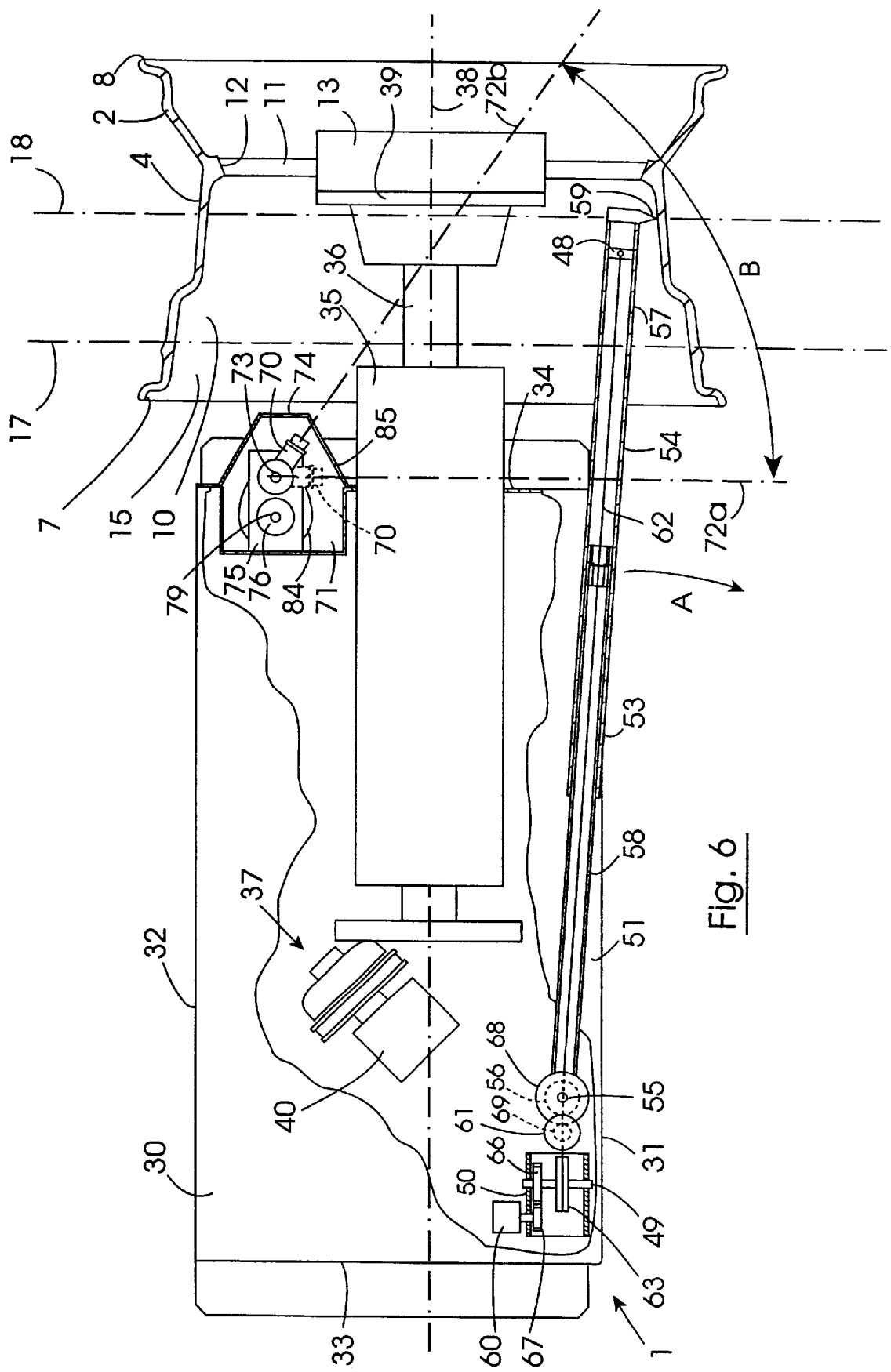
Figure 7:
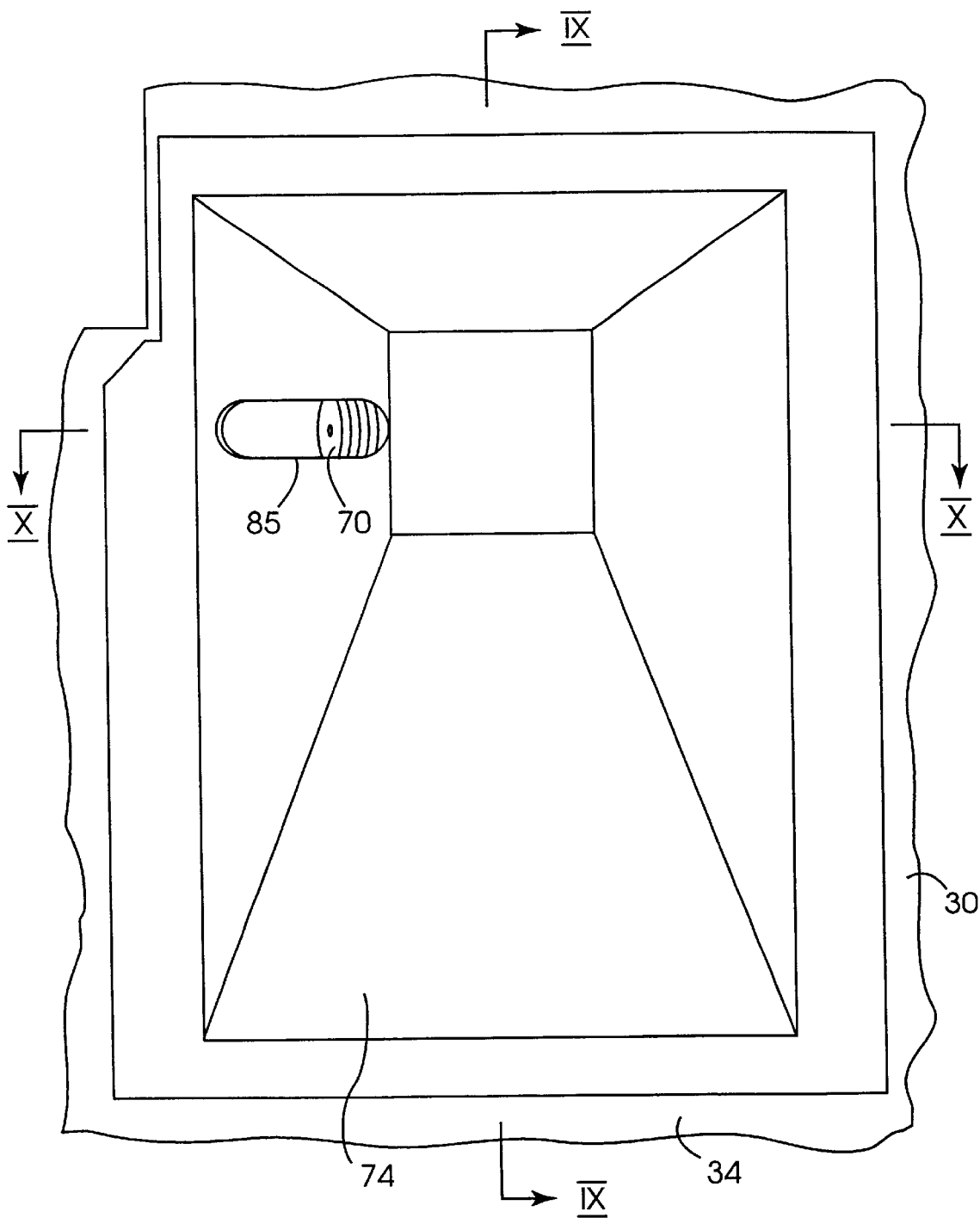
Figure 8:
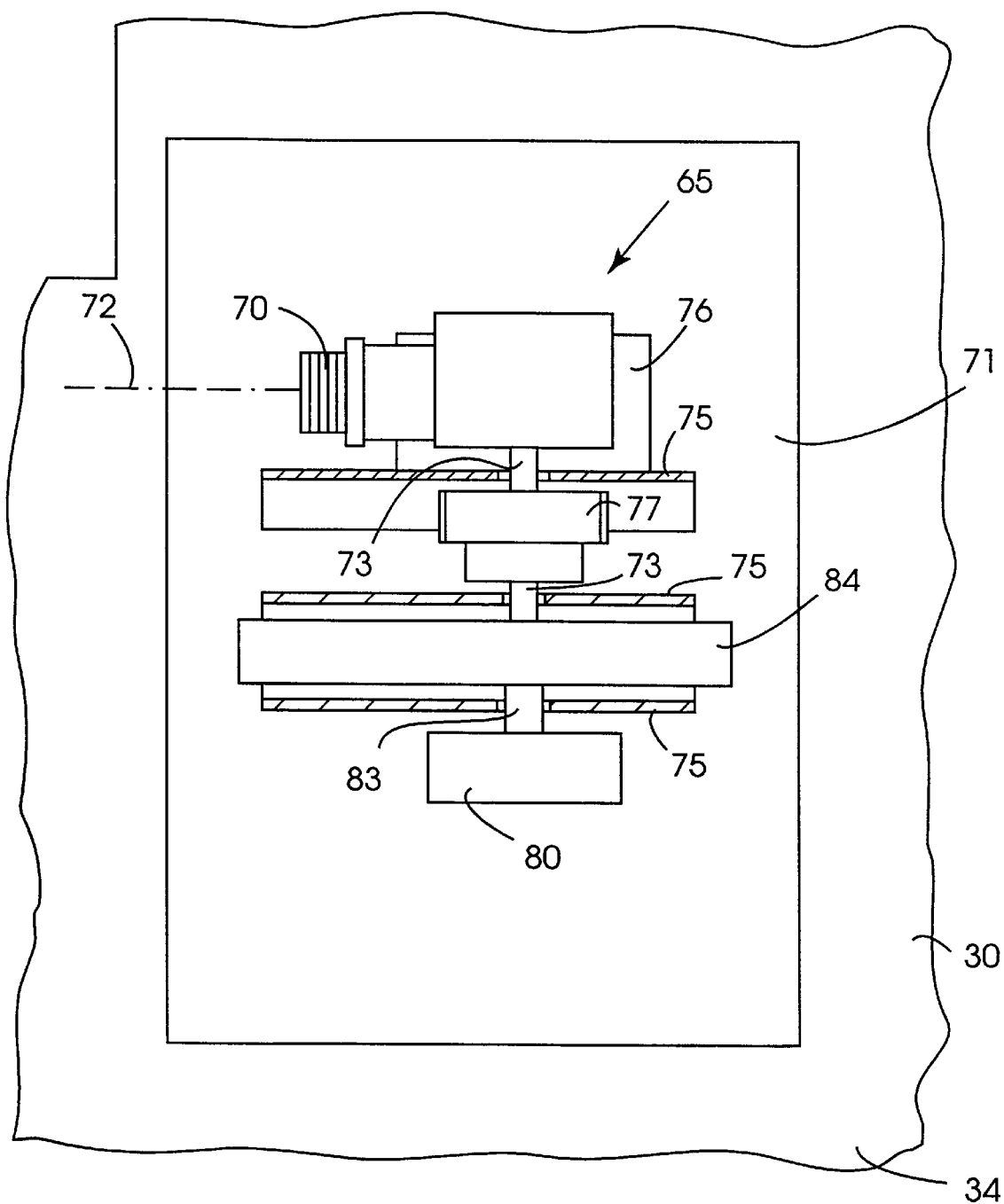
Figure 9:
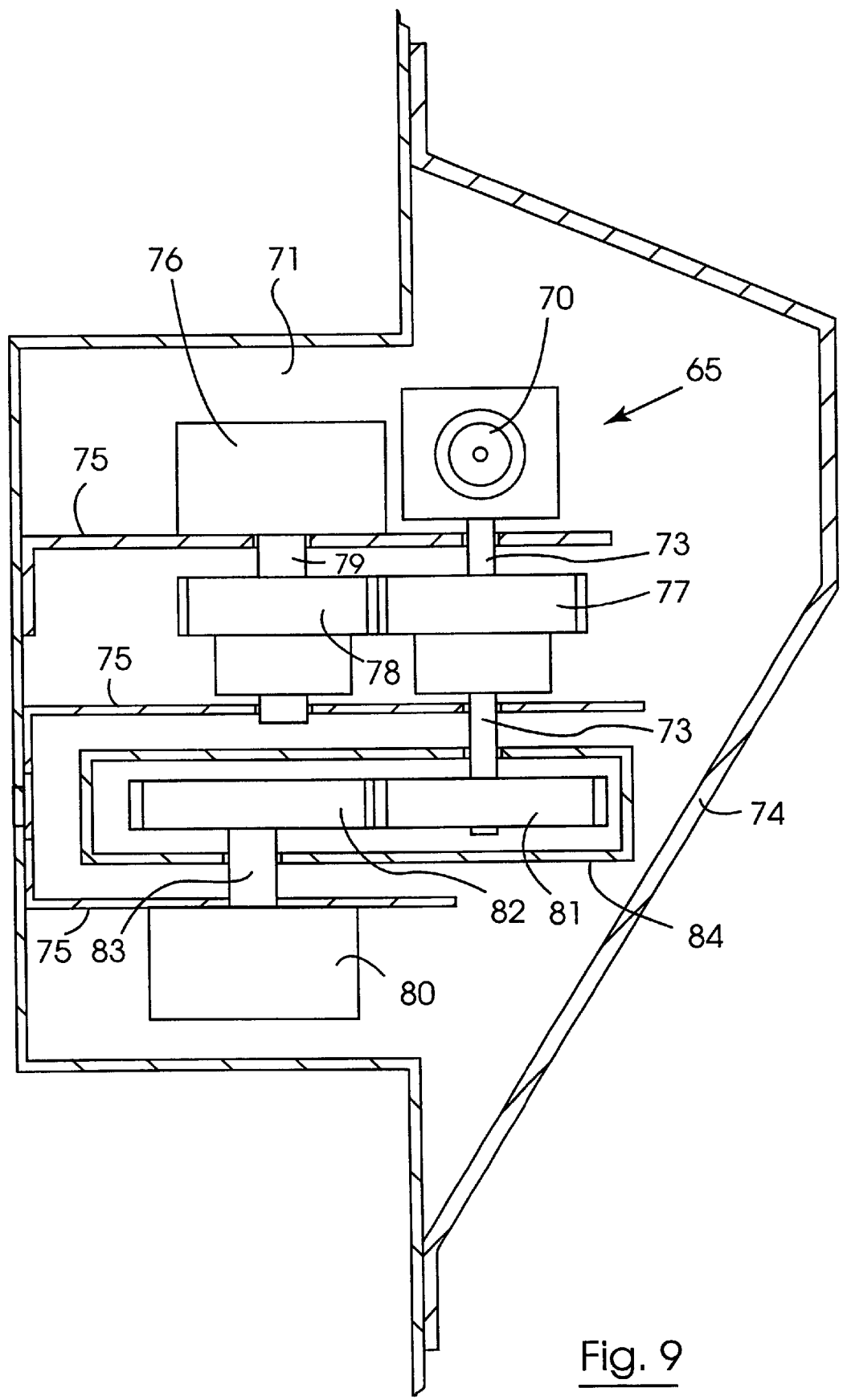
Figure 10:
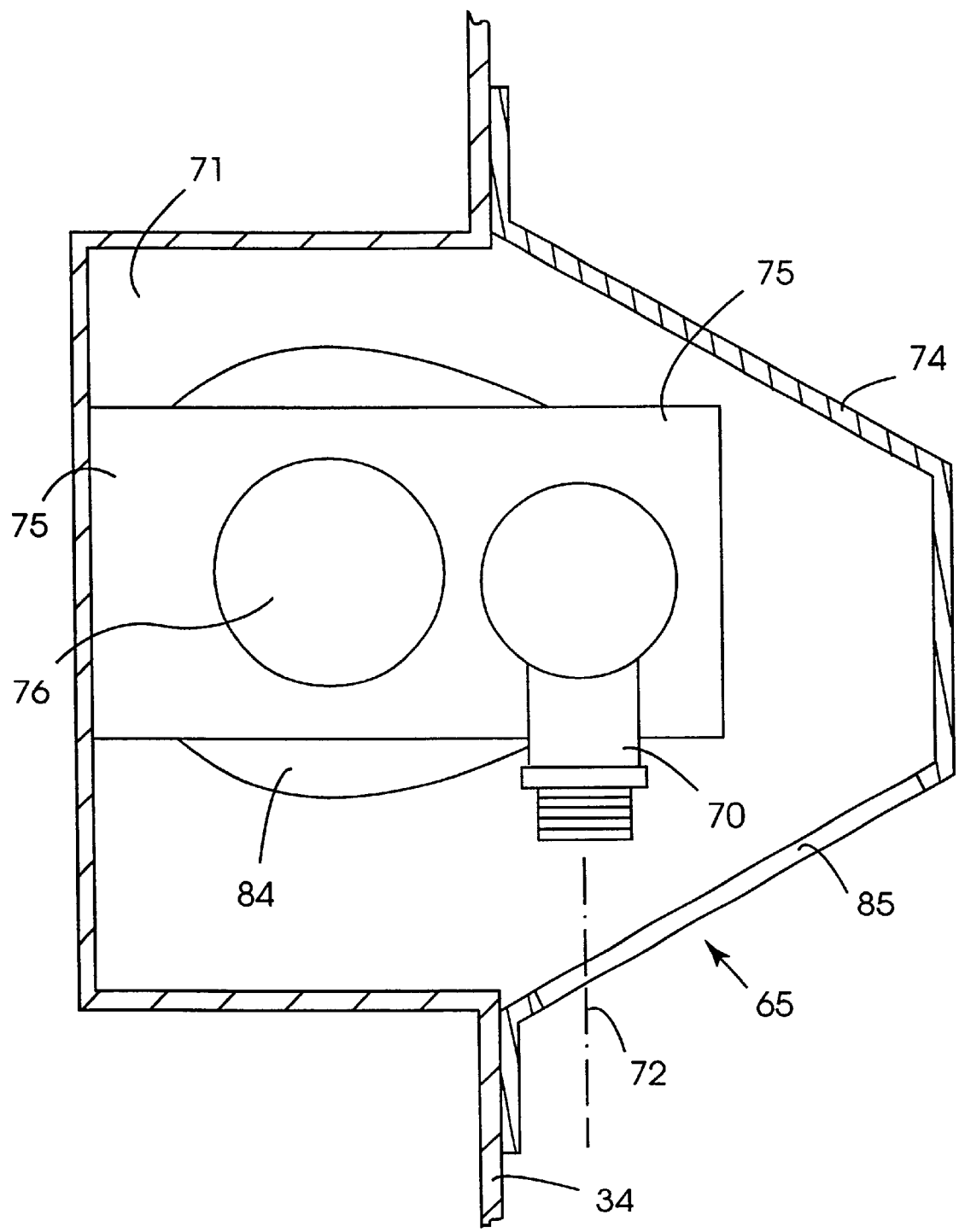
Figure 11:
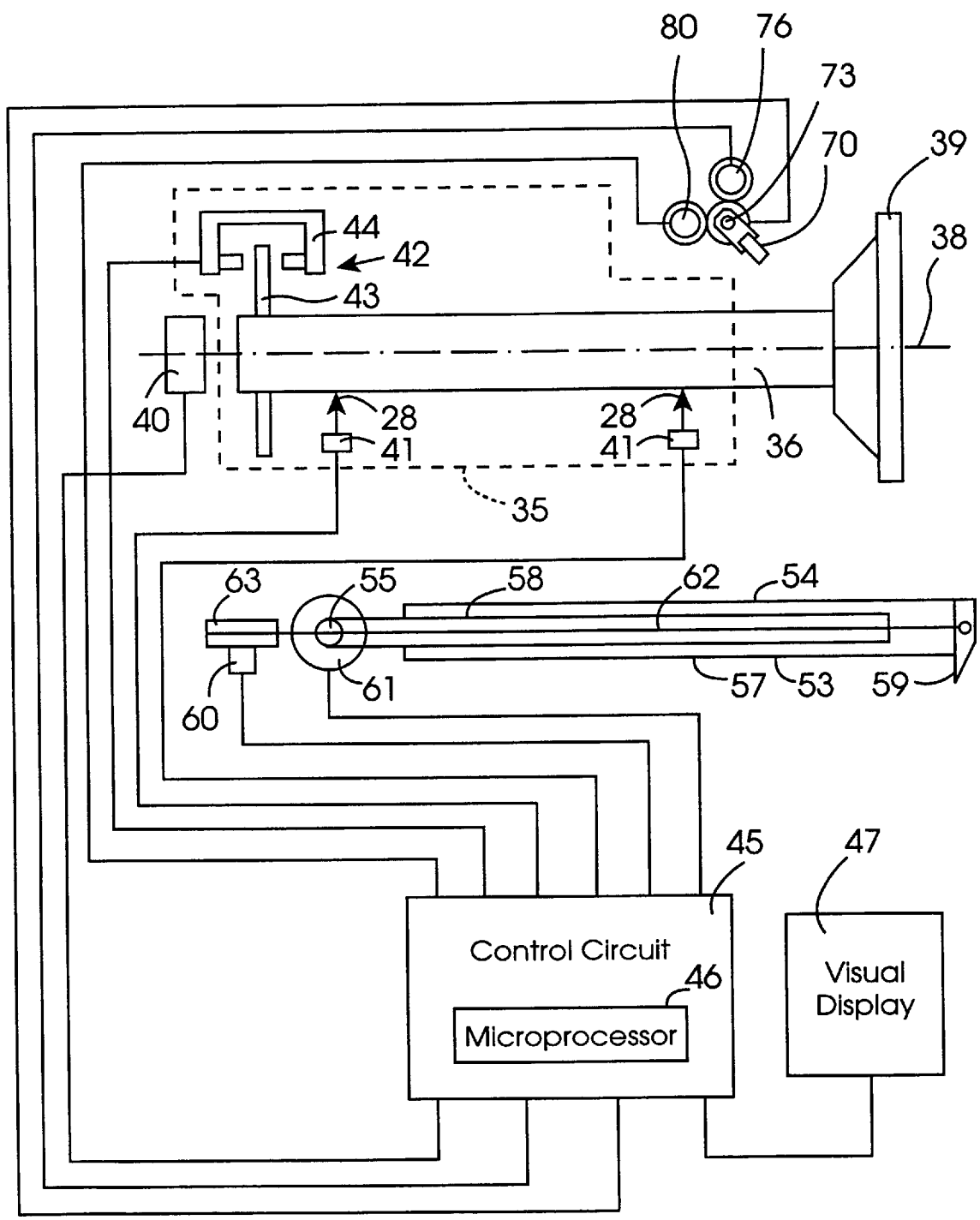
Figure 12:
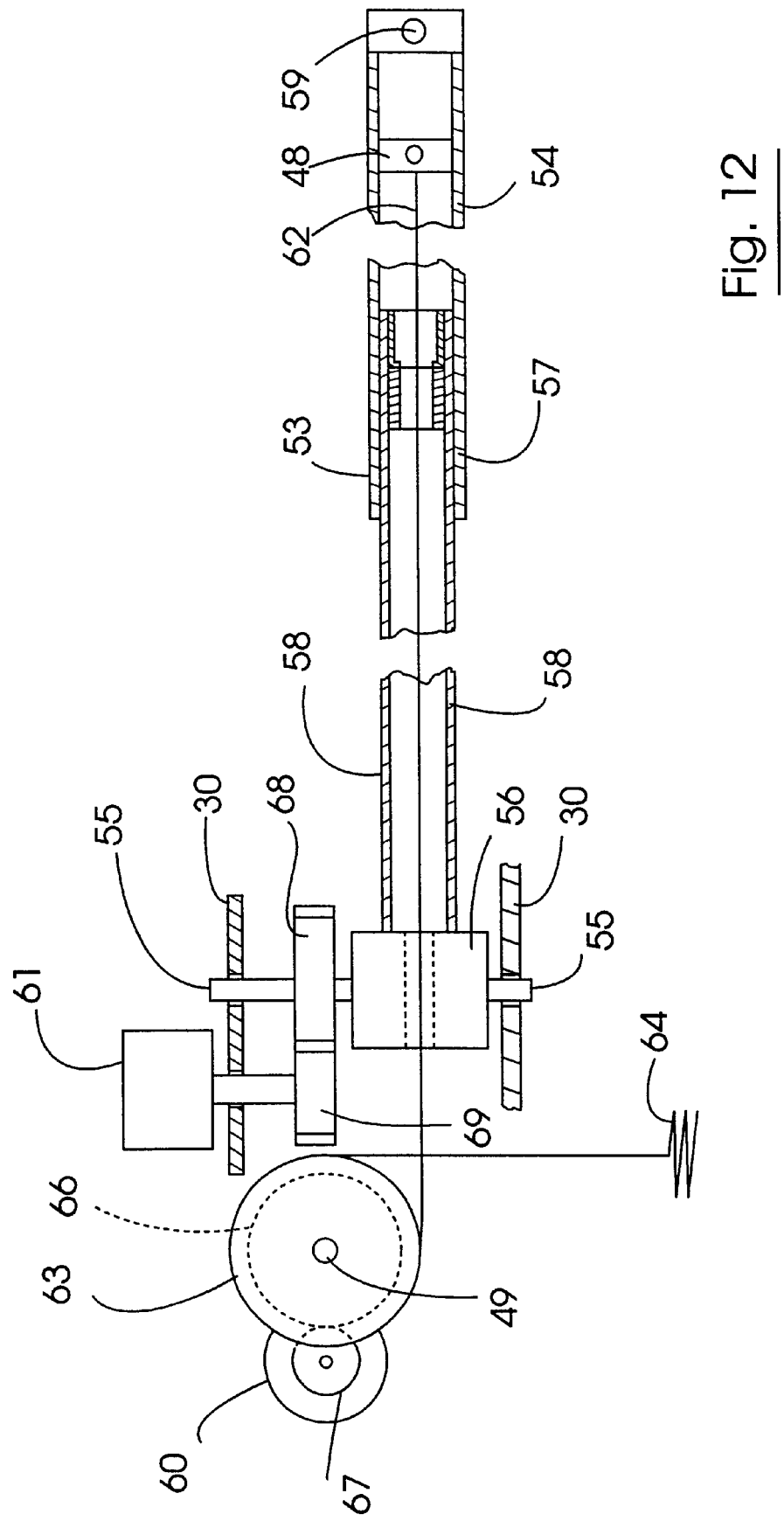
Figure 13:
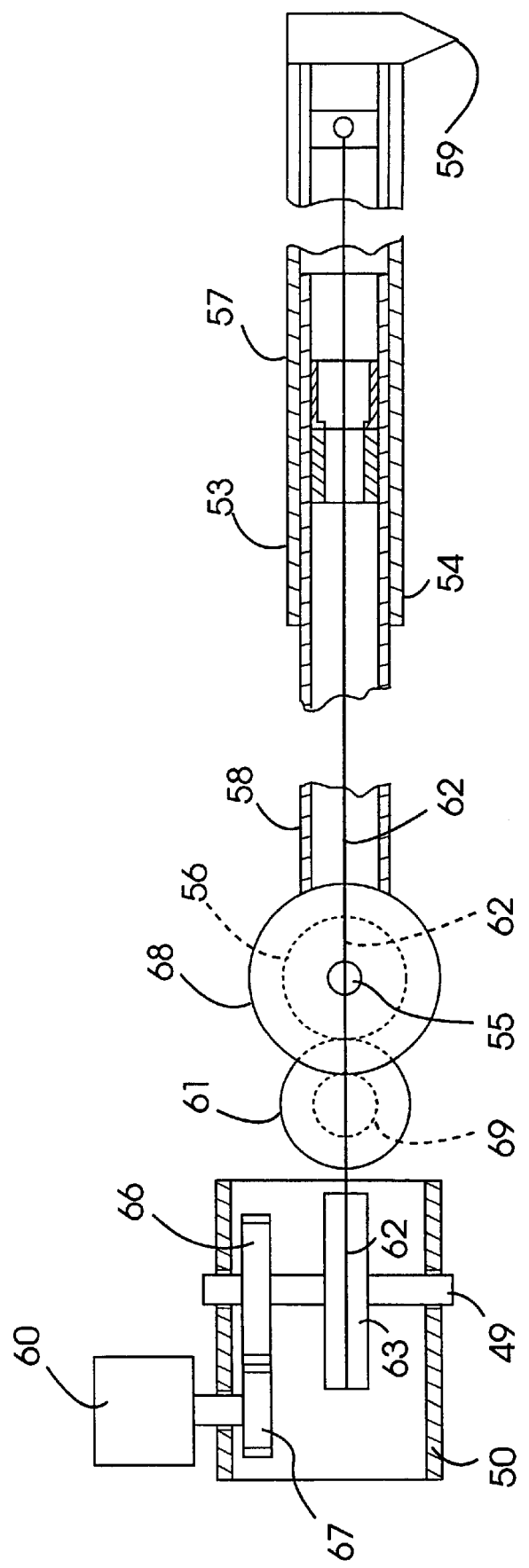
Figure 14:
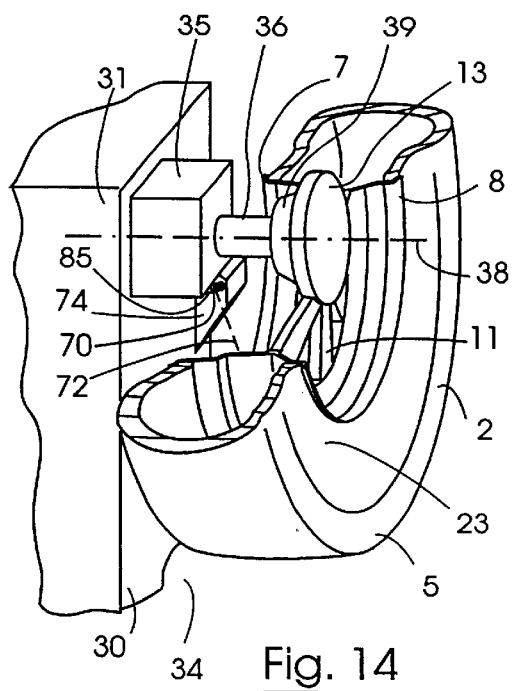
Figure 15:
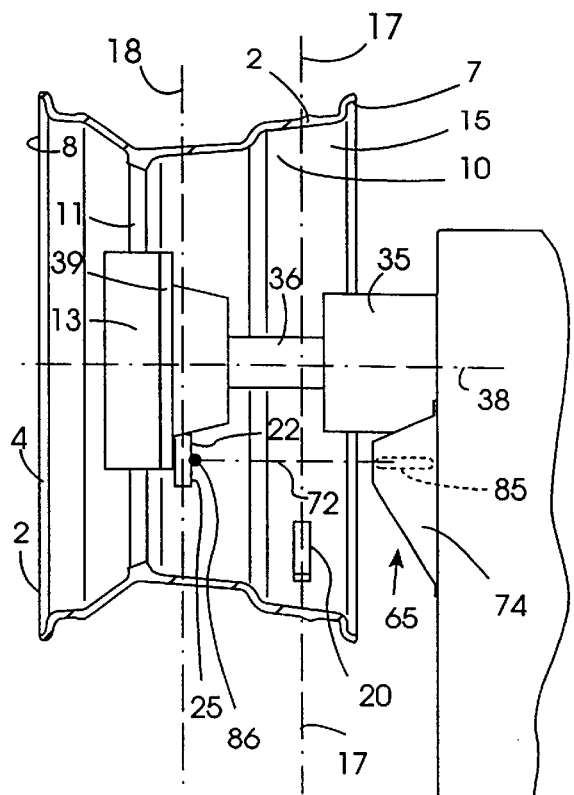
Figure 16:
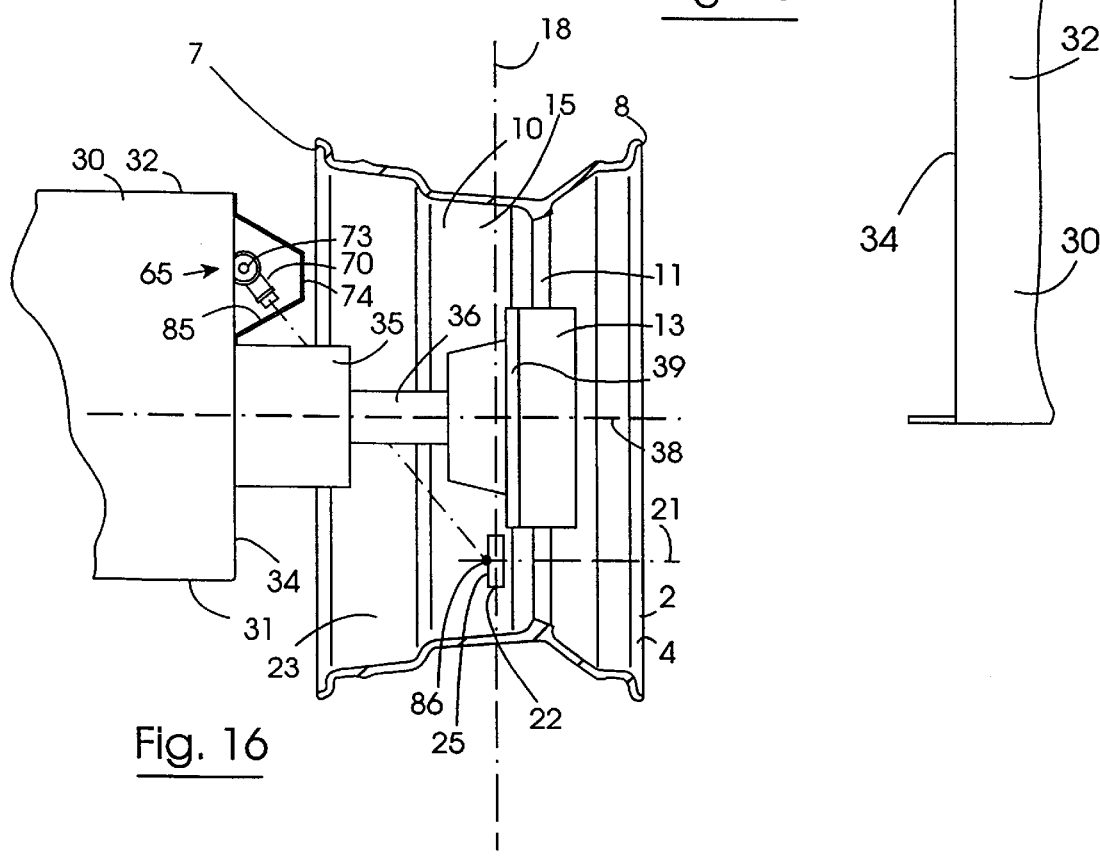
Figure 17:
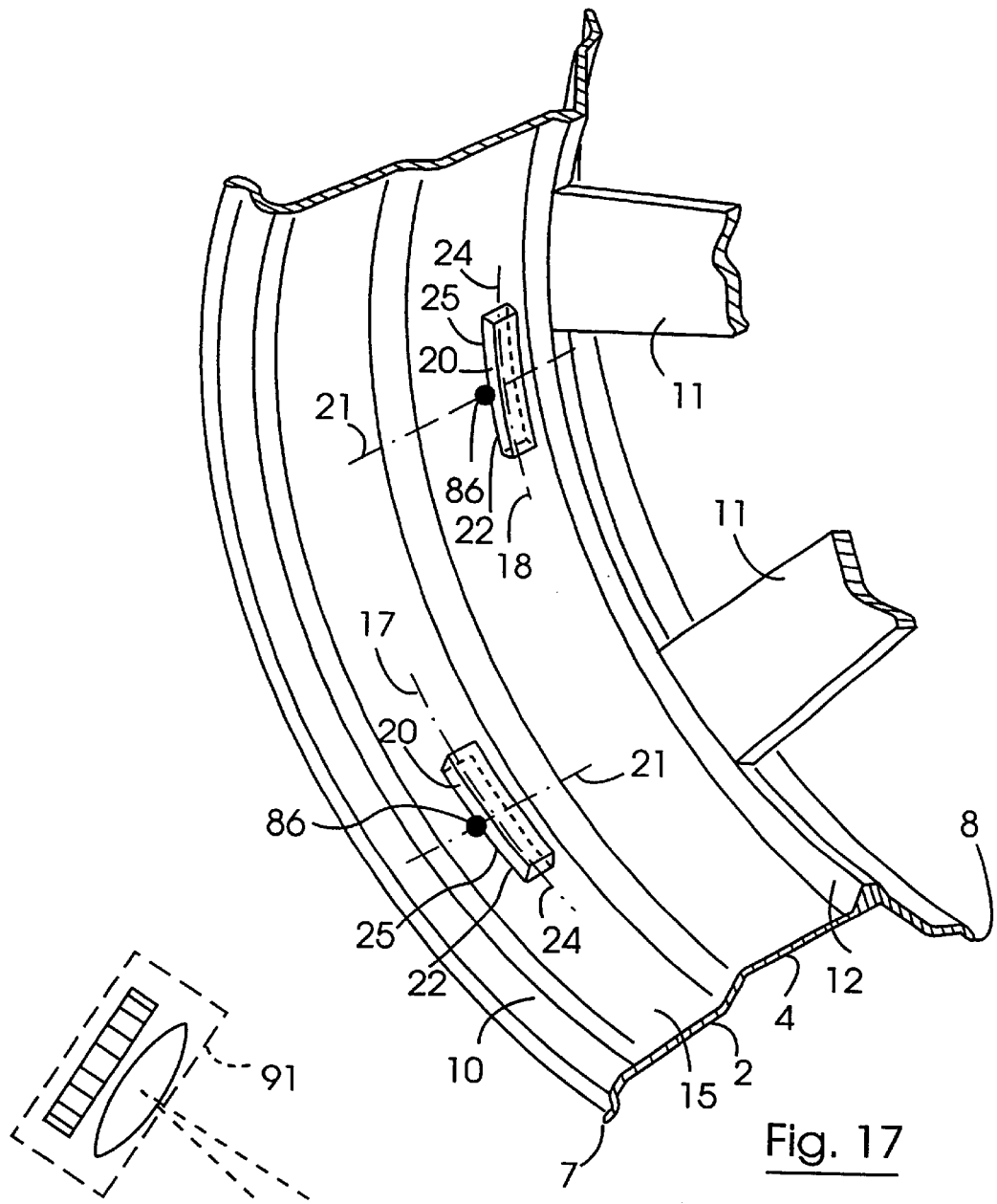
Figure 21:
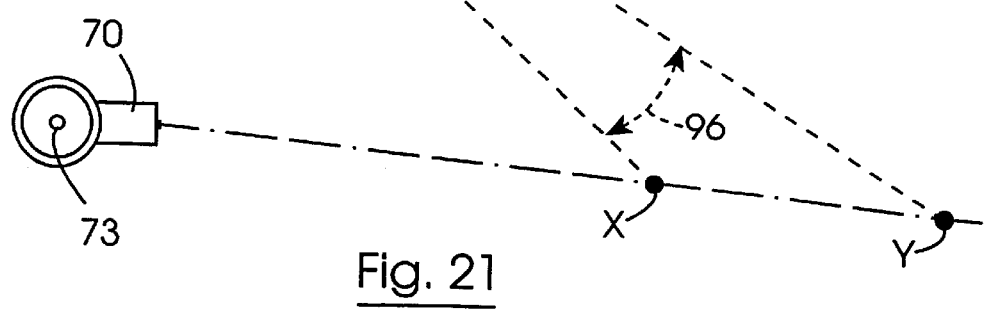
Figure 18:
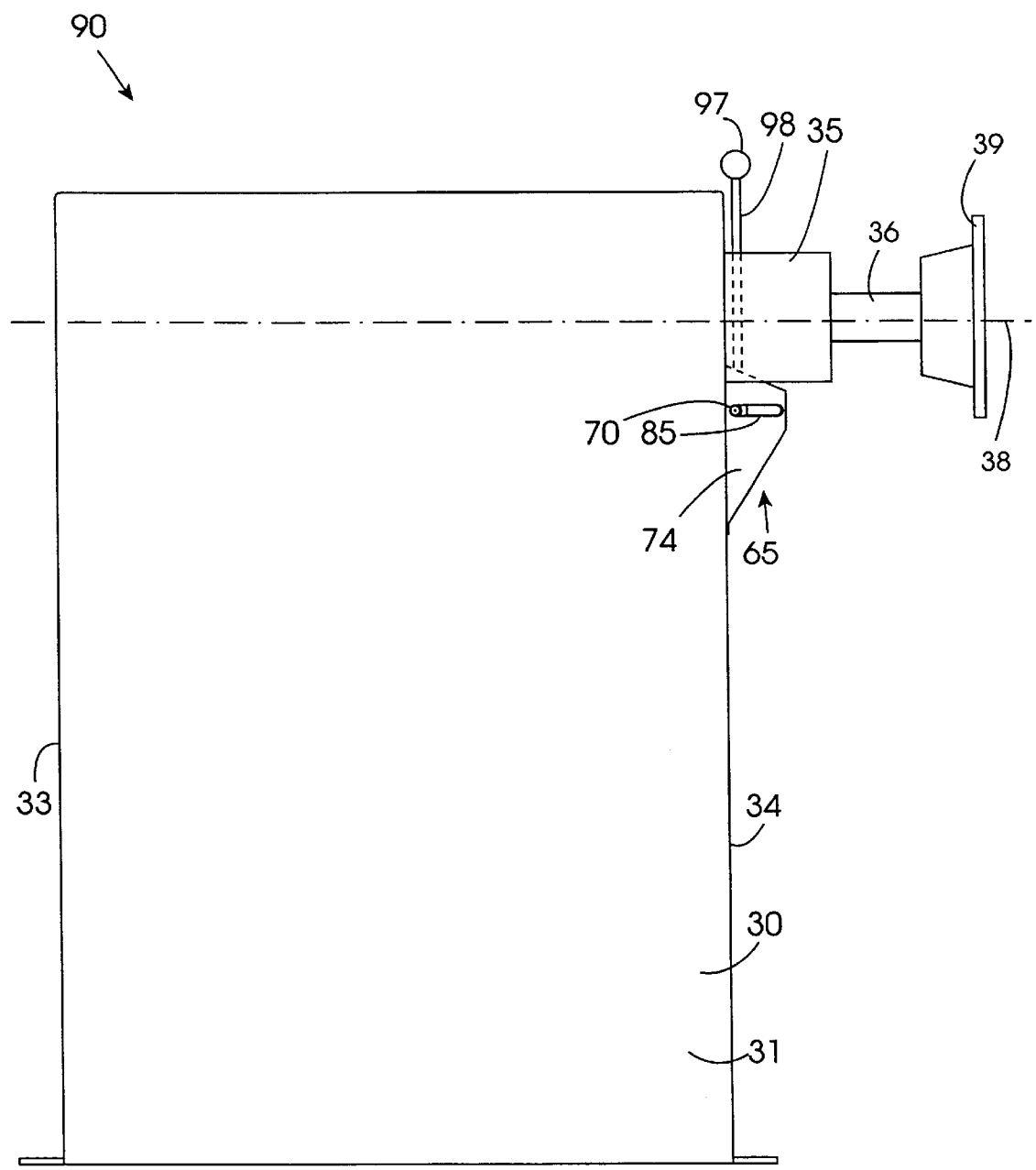
Figure 19:
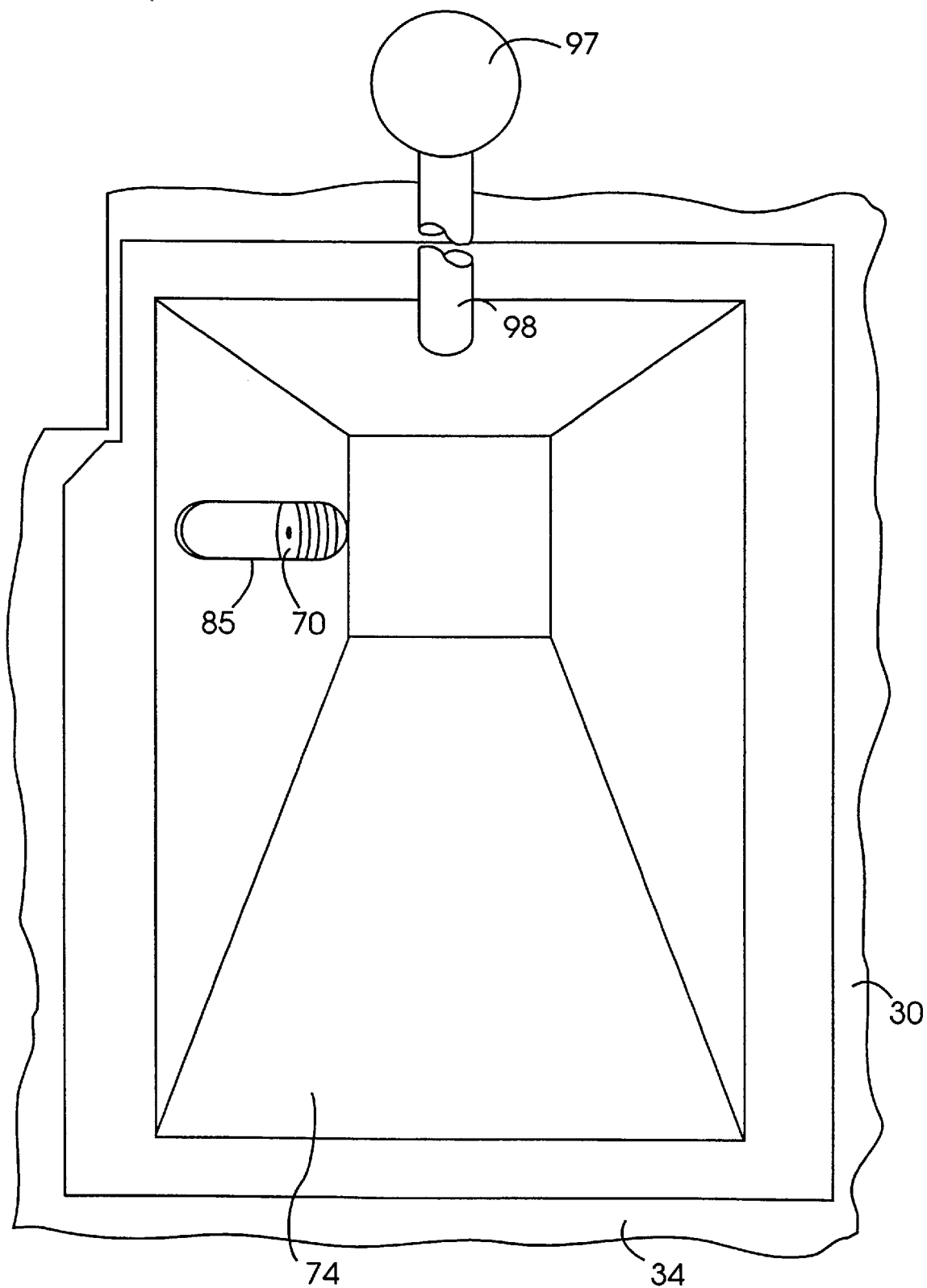
Figure 20:
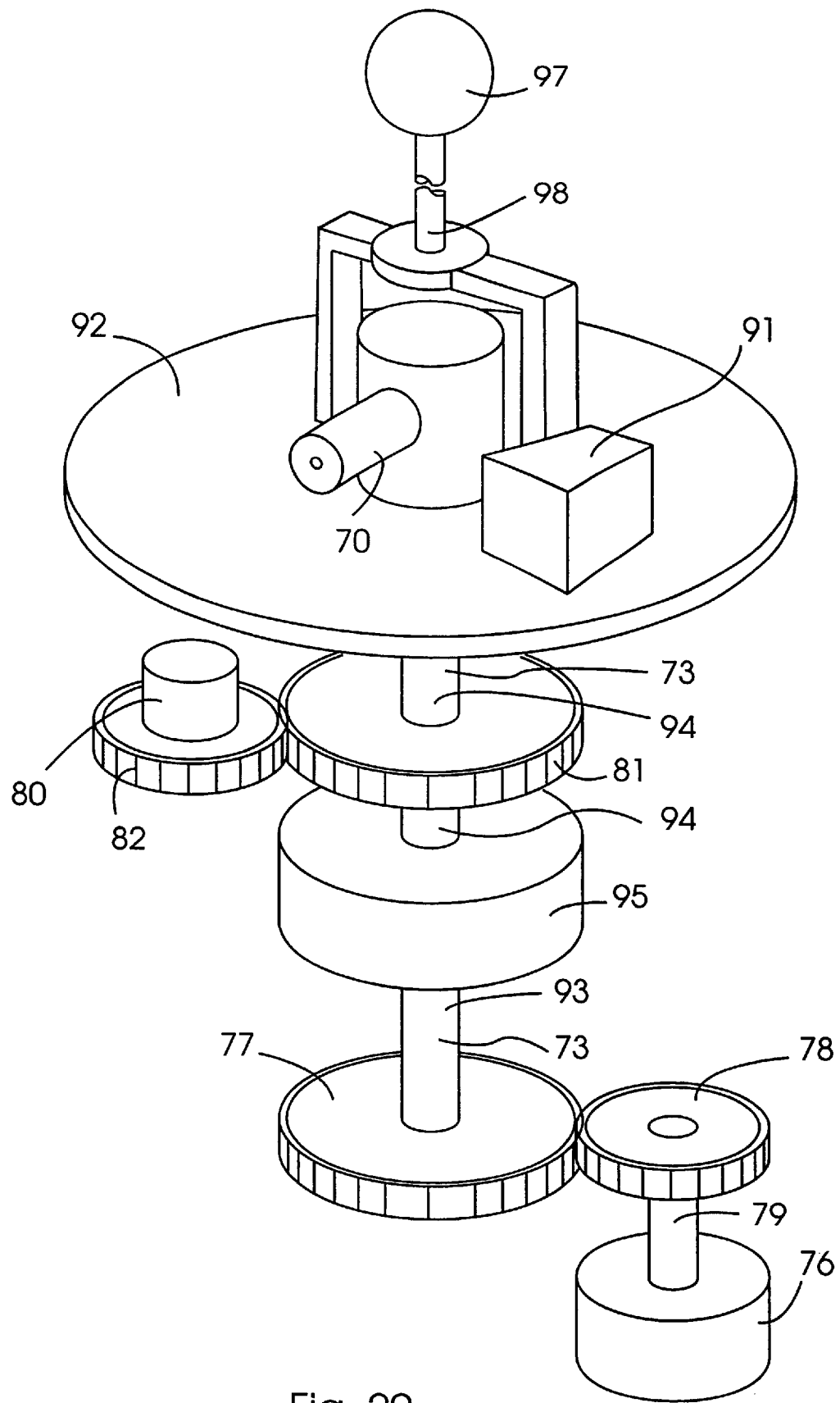
Figure 22:
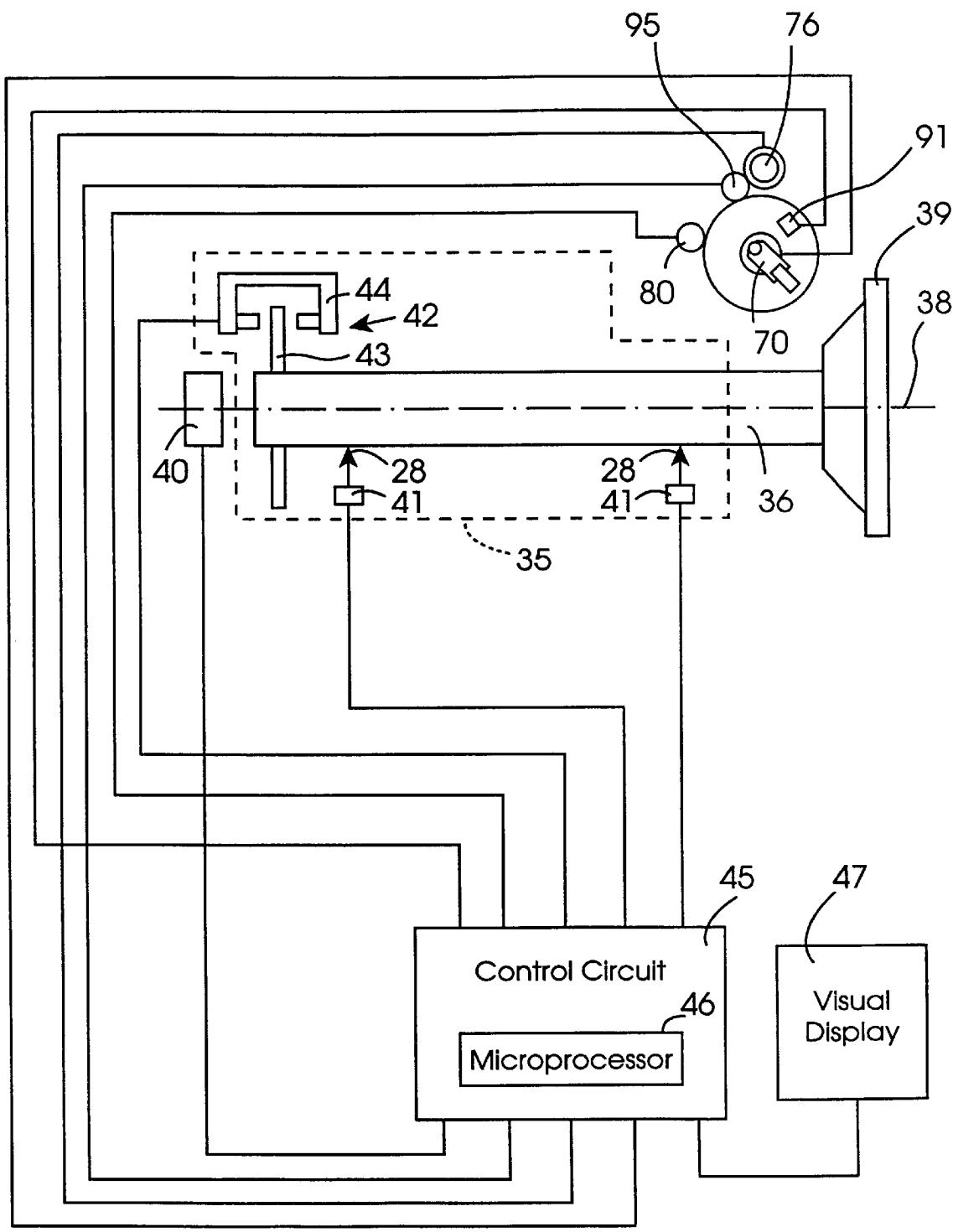

The invention will be more clearly understood from the following description of some preferred embodiments thereof which are given by way of example only with reference to the accompanying drawings, in which:

FIG. 1 is a front elevational view of a wheel balancer according to the invention, FIG. 2 is a plan view of the wheel balancer of FIG. 1, FIG. 3 is an end elevational view of the wheel balancer of FIG. 1, FIG. 4 is a partly cut-away front elevational view of the wheel balancer of FIG. 1, FIG. 5 is a partly cut-away and partly cross-sectional plan view of the wheel balancer of FIG. 1, FIG. 6 is a view similar to FIG. 5 of the wheel balancer of FIG. 1 with a part of the wheel balancer in a different position, FIG. 7 is an end elevational view of a detail of the wheel balancer of FIG. 1, FIG. 8 is an end elevational view of the detail of FIG. 7 with a part of the detail removed, FIG. 9 is a cross-sectional front elevational view of the detail of FIG. 7 on the line IX—IX of FIG. 7, FIG. 10 is a cross-sectional plan view of the detail of FIG. 7 on the line X—X of FIG. 7, FIG. 11 is a diagrammatic circuit diagram of a control circuit of the wheel balancer of FIG. 1, FIG. 12 is a cross-sectional diagrammatic front elevational view of another detail of the wheel balancer of FIG. 1, FIG. 13 is a cross-sectional diagrammatic plan view of the detail of FIG. 12, FIG. 14 is a partly cut-away diagrammatic perspective view of a part of the wheel balancer of FIG. 1 in use, FIG. 15 is a rear view of a part of the wheel balancer of FIG. 1 in use, FIG. 16 is a plan view of a part of the wheel balancer of FIG. 1 in use, FIG. 17 is a perspective view of a portion of a wheel balanced by the wheel balancer of FIG. 1, FIG. 18 is a front elevational view of a wheel balancer according to another embodiment of the invention, FIG. 19 is an end elevational view similar to FIG. 7 of a portion of a wheel balancer of FIG. 18, FIG. 20 is a perspective view of a portion of the wheel balancer of FIG. 18, FIG. 21 is a diagrammatic plan view illustrating operation of a portion of the wheel balancer of FIG. 18, and FIG. 22 is a diagrammatic circuit diagram of a control circuit of the wheel balancer of FIG. 18.

Referring to the drawings and initially to FIGS. 1 to 17, there is illustrated a wheel balancer according to the invention indicated generally by the reference numeral 1 for balancing a vehicle wheel 2. The wheel balancer 1 is a high speed dynamic wheel balancer, and is particularly suitable for balancing vehicle wheels 2 of the type which are referred to as alloy vehicle wheels. Such alloy wheels, in general, comprise the wheel hub 4 which is of a relatively light weight aluminium alloy material onto which a tire 5 is mounted. An inner rim 7 and an outer rim 8 of the wheel hub 4 retain the tire 5 on the hub 4. Spokes 11 also of alloy material, which are generally integrally cast with the wheel hub 4 extend from an inner surface 10 of the wheel hub 4 to a central hub 13 for securing to a wheel drum or other wheel carrier on a shaft of a motor vehicle. The spokes 11, in general, extend from the inner surface 10 of the wheel hub 4 at a location closer to the outer rim 8 than to the inner rim 7, typically at a location which is indicated by the reference numeral 12. The inner surface 10 and spokes 11 of the wheel hub 4 define a well 15 which extends inwardly from the inner rim 7.

For aesthetic purposes, it is desirable that correcting balance weights 10 for correcting imbalance in such wheels be located on the inner surface 10 in the well 15. Typically, the balance weights 20 are located in two axially spaced apart balancing planes which are normal to the axis of rotation of the wheel 2, and preferably, the balancing planes are spaced apart a distance which is preferably, at least 50 mm. The balancing planes are typically at locations indicated by the reference numerals 17 and 18, the reference numeral 17 indicating an inner balancing plane and the reference numeral 18 indicating an outer balancing plane. However, both balancing planes 17 and 18 are on the inner side of the spokes 11, and the balance weights 20 are thus substantially out of sight when the vehicle wheel 2 is mounted on a vehicle. This method for balancing such alloy wheels 2 will be well known to those skilled in the art.

The wheel balancer 1 as will be described below determines the magnitude and direction of imbalance forces in the wheel 2 in the respective balancing planes 17 and 18, and in turn, determines the magnitudes of correcting balance weights 20 required in the balancing planes 17 and 18 at balance weight receiving locations on the inner surface 10 of the wheel hub 4 to counteract the imbalance forces. The wheel balancer 1 indicates by means of a visually perceptible indication the precise balance weight positions 22 at which the respective balance weights 20 are to be attached to the inner surface 10 of the wheel hub 4 in the respective balancing planes 17 and 18. Additionally, for facilitating accuracy and ease of securing the balance weights 20 to the wheel hub 4, the balance weight positions 22 are only indicated when the wheel 2 has been rotated so that the balance weight positions 22 are located in respective positions which are visually accessible to an operator standing at the front of the wheel balancer 1. In this embodiment of the invention the balance weight positions 22 are indicated when they are in a lower front quadrant 23 of the wheel 2 relative to the axis of rotation of the wheel, as will be described below.

The balance weights 20 which are generally used for balancing such alloy wheels 2 are generally referred to as stick-on weights, and are elongated weights 20 having an adhesive backing for securing the weights 20 to the respective balance weight positions 22. The balance weights 20 define a longitudinal axis 24, and are attached to the corresponding balance weight position with their longitudinal axis 24 extending in a circumferential direction relative to the rotational axis of the wheel 2, and co inciding with the corresponding balancing plane 17 or 18, see FIG. 17.

The wheel balancer 1 comprises a support means, namely, a ground engaging support housing 30 having a front wall 31, a rear wall 32 and side walls 33 and 34 which join the front and rear walls 31 and 32, respectively. A sub-housing 35 is mounted in the support housing 30 adjacent the top thereof and projects through the side wall 34. The sub-housing 35 rotatably carries a main shaft 36 onto which the wheel 2 is secured for balancing. The main shaft 36 is rotatable about a rotational axis 38 in bearings 28 which are diagrammatically illustrated in FIG. 11 only, and which are carried in a sleeve (not shown) which is in turn located within the sub-housing 35. The rotatable mounting of the main shaft 36 in the sub-housing 35 will be well known to those skilled in the art. A receiving means comprising a wheel mounting flange 39 is carried on the main shaft 36 for mounting the wheel 2 on the main shaft 36 with the axis of rotation of the wheel 2 co-axial with the rotational axis 38 of the main shaft 36. A shaft drive means, namely, a drive motor 40 is mounted in the support housing 30, and drives the main shaft 36 up to the desired balancing speed through a disengagable transmission 37. The main shaft 36 is disengagable from the drive motor 40 by the disengagable transmission 37 when the main shaft 36 has been driven up to the desired balancing speed for permitting determination of the imbalance in the wheel.

A monitoring means for monitoring the magnitude of imbalance forces induced in the main shaft 36 by imbalance forces in the wheel 2 comprises a pair of axially spaced apart strain transducers 41 which are illustrated diagrammatically in FIG. 11 only. The strain transducers 41 are located on respective axially spaced apart mounting brackets (not shown) which mount the sleeve (not shown) within which the main shaft 36 is rotatable in the sub-housing 35. The strain transducers 41 monitor the magnitude of imbalance forces in the main shaft 36 at the locations of the mounting brackets (not shown). The mounting of such transducers will be well known to those skilled in the art. A rotary encoder 42 which comprises an encoder disc 43 fast on the main shaft 36 co-operates with a photosensor and light source assembly 44 for facilitating monitoring of the angular position of the main shaft 36 and the wheel 2 for in turn determining the direction of the imbalance forces detected by the strain transducers 41. The rotary encoder 42 is illustrated diagrammatically in FIG. 11 only. Signals generated by the strain transducers 41 and the photosensor/light source assembly 43 are relayed to a control circuit 45 which controls operation of the wheel balancer 1, see FIG. 11. The control circuit 45 comprises a microprocessor 46 which computes the magnitude and direction of the imbalance forces in the main shaft 36. From this and other data the microprocessor 46 computes the magnitude of the correcting balance weights 20 required and the angular location of the balance weight positions 22 at which the balance weights 20 are to be attached to the wheel hub 4 on the inner surface 10 in the balancing planes 17 and 18. This aspect of the wheel balancer 1 will be well known to those skilled in the art. A visual display 47, illustrated only in FIG. 11, which is located on the support housing 30 displays the magnitudes of the balance weights 20 which are required in the respective balancing planes 17 and 18 to correct the imbalance in the wheel 2.

A sensing means for detecting the balance weight receiving locations in the respective balancing planes 17 and 18 comprises a contact sensor 53 which comprises a sensor arm 54. The sensor arm 54 is pivotally connected to the support housing 30 by a vertically extending pivot shaft 55 within the support housing 30, and extends from the support housing 30 through a slot 52. A recess 51 at the top and to the front of the support housing 30 accommodates the sensor arm 54 in a rest position extending parallel to the main shaft 36, see FIGS. 1, 2 and 3. The sensor arm 54 is of telescoping construction having an outer member 57 and an inner member 58 which telescopes within the outer member 57. An engagement pointer 59 is mounted on the distal end of the outer member 57 for engaging the balance weight receiving locations in the selected balancing planes 17 and 18 for detection thereof. The sensor arm 54 is extendable from a rest condition with the inner member 58 telescoped in the outer member 57 as illustrated in FIGS. 1 and 2, to an infinite number of extended conditions for facilitating engagement of the engagement pointer 59 with the inner surface 10 of the wheel hub 4 in the respective selected balancing planes 17 and 18. The sensor arm 54 is also simultaneously pivotal from the rest condition lying parallel to the main shaft 36 through a horizontal plane E forwardly in the direction of the arrow A about a vertical pivot axis defined by the pivot shaft 55 for facilitating engagement of the engagement pointer 59 with the inner surface 10 of the wheel hub 4 in the respective selected balancing planes 17 and 18, as the outer member 57 is being extended from the inner member 58. The inner member 58 extends radially from a circular carrier member 56 which is fast on the pivot shaft 55. Bearings (not shown) in the support housing 30 rotatably carry the pivot shaft 55 so that the pivot shaft 55 pivots with the sensor arm 54 as the sensor arm 54 is being pivoted through the horizontal plane.

First and second signal generating means for generating signals which represent the positions of the balancing planes 17 and 18 along the rotational axis 38 of the main shaft 36 relative to a reference plane (not shown), and the radii of the respective balance weight receiving locations in the balancing planes 17 and 18 comprise first and second potentiometers 60 and 61 which are mounted in the support housing 30 and are associated with the sensor arm 54. The first potentiometer 60 outputs signals which are proportional to the distance by which the outer telescoping arm 57 is extended outwardly of the inner telescoping member 58 from the rest condition. The second potentiometer 61 outputs signals which are proportional to the angle through which the sensor arm 54 is pivoted in the direction of the arrow A from the rest condition.

Referring in particular to FIGS. 12 and 13, a cable 62 connected to an eye bracket 48 in the outer member 57 extends through the sensor arm 54 and through the carrier member 56 around a pulley 63. The pulley 63 is rigidly carried on a shaft 49 which in turn is rotatably mounted in bearings (not shown) in a mounting bracket 50 mounted in the support housing 30. A gear 66 fast on the shaft 49 rotates with the pulley 63 and drives a gear 67 which in turn rotates the potentiometer 60 for outputting a signal proportional to the rotation of the pulley 63, which in turn is proportional to the distance to which the outer member 57 is extended relative to the inner member 58 of the sensor arm 54. The cable 62 is connected to a tension spring 64, which in turn, is anchored to the housing 30 for maintaining continuous tension in the cable 62. A gear 68 which is fast on the pivot shaft 55 and which rotates with the pivot shaft 55 drives a gear 69, which in turn, rotates the potentiometer 61 for outputting a signal which is proportional to the angular displacement of the sensor arm 54 in the horizontal plane in the direction of the arrow A from the rest condition.

The respective signals from the potentiometers 60 and 61 are relayed to the control circuit 45 and in turn to the microprocessor 46 for facilitating computation by the microprocessor 46 of the positions of the respective balancing planes 17 and 18 and the radii of the respective balance weight receiving locations in the planes 17 and 18, and in turn for use in the computation of the magnitude of the correcting balance weights 20 and the angular locations of the balance weight positions 22 by the microprocessor 46. Such sensor arms and their operation will be known to those skilled in the art, as will the computation of the magnitude and angular positions of correcting balance weights.

A non-contact position indicating means for indicating by means of a visually perceptible indication on the inner surface 10 of the wheel hub 4, the positions 22 at which the balance weights 20 are to be located to correct the imbalance in the wheel 2 comprises an indicator mechanism 65 which is mounted in a recess 71 in the side wall 34 of the support housing 30. The indicator mechanism 65 comprises a laser light source 70 which projects a horizontal pencil laser light beam 72 onto the inner surface 10 of the wheel well 15 at the lower front quadrant 23 of the wheel hub 4 for indicating by a point dot 86 of light the respective balance weight positions 22 under the control of the microprocessor 46. The laser light beam 72 is illustrated by broken lines, and the dot 86 of light is illustrated in FIGS. 15 to 17. A cover 74 closes the recess 71, and an elongated horizontal slot 85 in the cover accommodates the light beam 72 therethrough. The laser light source 70 is rigidly mounted on a vertically extending carrier shaft 73, which is in turn rotatably carried in carrier brackets 75, which extend from the support housing 30 in the recess 71. The laser light source 70 is mounted to the rear of a vertical plane which contains the rotational axis 38 of the main shaft 36, and projects the light beam to sweep through a horizontal arc B in a horizontal plane H below the main shaft 36 on rotation of the carrier shaft 73, see FIGS. 3, 5 and 6.

A drive means, namely, a stepper motor 76 is mounted in the recess 71 on one of the brackets 75, and under the control of the microprocessor 46 drives the carrier shaft 73 for pivoting the laser light source 70 about the vertical axis defined by the carrier shaft 73 for aligning the laser light source 70 to project the light beam 72 onto the inner surface 10 of the wheel hub 4 for indicating the respective balance weight positions 22, as will be described below. The stepper motor 76 drives the carrier shaft 73 through gears 77 and 78 on the carrier shaft 73 and a drive shaft 79, respectively, of the stepper motor 76.

The stepper motor 76 drives the carrier shaft 73 under the control of the microprocessor 46 so that when the laser light source 70 is projecting the light beam 72 for indicating the location of either one of the balance weight positions 22, the light beam 72 is directed sidewardly forwardly of the support housing 30 towards the inner surface 10 of a lower front quadrant 23 of the wheel hub 4 which is disposed to the front of the support housing 30. In this way, the balance weight positions 22 which are indicated by the light beam 72 are clearly visually accessible to the operator for facilitating attachment of the respective correcting balance weights 20 to the wheel hub 4. In this embodiment of the invention, depending on the radius of the balance weight receiving locations in the balancing planes 17 and 18, the balance weight positions 22 are indicated by the light beam 72 when the balance weight positions 22 are located at an angle in the range of 50° to 71° from the bottom dead centre position of the wheel 2 and towards the front thereof.

For ensuring that the respective balance weight positions 22 are accurately indicated by the light source 70, the light source 70 is only powered up to project the light beam 72 when the wheel has been rotated to bring the balance weight position 22 which is to be indicated by the laser light source 70 into direct alignment with the laser light source 70. Furthermore, the laser light source 70 only remains powered up for projecting the light beam 72 while the balance weight position 22 remains in alignment with the light beam 72. Should the wheel be further rotated thereby moving the balance weight position 22 out of alignment with the light beam 72, the light source 70 is immediately powered down.

In this embodiment of the invention the laser light beam 72 forms the dot 86 of light on the inner surface 10 at the point of intersection of the angular center line 21 of each balance weight position 22 which is parallel to the axis of rotation of the wheel 2, and an inner circumferential side edge 25 of each balance weight position 22, see FIGS. 15 to 17. The inner circumferential side edge 25 is that side edge of the balance weight position 22 which is nearest the inner rim 7 of the wheel hub 4. In this way the balance weights 20 may be accurately aligned with the balance weight positions 22, and in turn accurately secured by the operator.

Additionally, the location of the main shaft 36 and the mounting flange 39 on the shaft 36 relative to the support housing 30 is such as to likewise facilitate easy access both visually and manually by the operator when standing at the front of the wheel balancer 1 to the respective balance weight positions 22 as they are sequentially indicated by the light beam 72.

The laser light source 70 is pivotal about the vertical axis defined by the carrier shaft 73 through the arc B between its two extreme positions, which in this embodiment of the invention is an angle of 55°. In the first extreme position with the laser light source 70 projecting the light beam 72a the light beam 72a extends perpendicularly through a vertical plane which contains the rotational axis 38 of the main shaft 36. In the second extreme position, the light beam 72b extends at an angle of 35° through the vertical plane which contains the rotational axis 38 of the main shaft 36. The horizontal plane H through which the light beam 72 is swept is approximately 83 mm below a horizontal plane which contains the rotational axis 38 of the main shaft 36. Needless to say, the invention is not to be limited by these dimensions.

In FIG. 3, the wheel balancer 1 is illustrated with wheel rims 4 of two different sizes mounted on the main shaft 36. The outer peripheries only of the rims of the wheel hubs 4 are illustrated by the broken lines. While these are not the maximum and minimum sizes of wheel rims which may be balanced by the wheel balancer 1, they give an indication of the broad range of wheel rim sizes which may be balanced on the wheel balancer 1. As can be seen in FIG. 3, the balance weight position 22 is indicated by the light beam 72 when the balance weight position 22 is at an angle C of 57° from the bottom dead centre position of the wheel 2 of the smaller diameter. In the larger diameter wheel the balance weight position 22 is indicated by the light beam 72 when the balance weight position 22 is at an angle D of 71° from the bottom dead centre position of the wheel 2. FIG. 3 also illustrates the horizontal plane E through which the sensor arm 54 is pivotal. In this embodiment of the invention, the working angle G within which the operator works for detecting the balance weight receiving locations with the sensor arm 54, and for attaching the balance weights 20 to the wheel hub 4 is 23.6° when working with the smallest and largest diameter wheel rims 4 illustrated in FIG. 3. The working angle G is the angle which the point of contact of the sensor arm 54 with the larger diameter wheel and the point of contact of the light beam 72 with the smaller diameter wheel hub 4 make with the rotational axis of the main shaft 36.

A feedback means for indicating to the control circuit 45 the position of the laser light source 70 relative to its two extreme positions comprises a potentiometer 80 which is located in the recess 71 and is carried on one of the mounting brackets 75. The potentiometer 80 is rotated by the carrier shaft 73 through gears 81 and 82 which are fast on the carrier shaft 73 and a shaft 83 of the potentiometer 80, respectively. A housing 84 houses the gears 81 and 82. Accordingly, by reading signals from the potentiometer 80, the microprocessor 46 can determine the angle at which the light source 70 is projecting the light beam 72. This provides a cross-check of the angle at which the light beam 72 is being projected by the light source 70, and also facilitates calibration of the angular position of the light source 70 when the wheel balancer 1 is powered up.

In use, a wheel 2 to be balanced is mounted on the wheel mounting flange 39 with the axis of rotation of the wheel 2 co-inciding with the rotational axis 38 of the main shaft 36. The operator selects the most desirable location of the balancing planes 17 and 18, and extends and pivots the sensor arm 54 for sequentially engaging the inner surface 10 of the wheel hub 4 at the respective selected balancing planes 17 and 18 with the engagement pointer 59. As the engagement pointer 59 is sequentially engaged with the inner surface 10 of the wheel hub 4 at the respective balancing planes 17 and 18, an inputting button (not shown) on the support housing 30 is operated by the operator for relaying signals from the first and second potentiometers 60 and 61, respectively, to the control circuit 45. The wheel balancer is then operated in a conventional fashion, the main shaft 36 being run up to the desired balancing speed by the drive motor 40, which then disengages the main shaft 36, permitting the main shaft 36 with the wheel 2 attached to freely rotate.

The microprocessor 46 computes the radii of the balance weight receiving locations on the inner surface 10 of the wheel hub 4 at the balancing planes 17 and 18, and the distance along the rotational axis 36 from the reference plane (not shown) of the balancing planes 17 and 18 from the signals received from the first and second potentiometers 60 and 61. The microprocessor 46 then computes the imbalance forces acting in the main shaft 36 from signals received from the strain transducers 41 and the rotary encoder 42. From this computation and the previous computation of the radius and axial positions of the balance weight receiving locations in the balancing planes 17 and 18, the microprocessor 46 computes the magnitude and angular directions of imbalance forces in the wheel 2 in the balancing planes 17 and 18. The magnitude of the balance weights 20 required to correct the imbalance in the balancing planes 17 and 18 are then computed by the microprocessor 46, and the angular positions of the balance weight positions 22 of the respective balance weights 20 are then computed by the microprocessor 46. The magnitude of the respective balance weights 20 are displayed on the visual display 47 and the balancing planes 17 and 18 to which the respective magnitudes of the balance weights 20 relate are identified.

The stepper motor 76 is then operated under the control of the microprocessor 46 for pivoting the carrier shaft 73, for in turn, positioning the laser light source 70 so that the light beam 72 when the laser light source 70 is powered up is directed onto the inner surface 10 of the wheel hub 4 for indicating the balance weight position 22 at which one of the balance weights 20 is to be secured. In this embodiment of the invention, the laser light source 70 is set to indicate the balance weight position 22 in the balancing plane 17 first. The wheel 2 is then slowly rotated by the operator, and when the balance weight position 22 in the balancing plane 17 is directly aligned with the laser light source 70, the laser light source 70 is powered up for directing the light beam 72 at the wheel hub 4. The light beam 72 forms the dot 86 of laser light on the inner surface 10 of the wheel hub 4 which indicates the point of intersection of the angular centre line 21 of the balance weight position 22 parallel to the rotational axis 38 of the main shaft 36, and the inner circumferential side edge 25 of the balance weight position 22.

The operator then attaches a balance weight 20 of the appropriate value to the wheel hub 4 using the laser light dot 86 on the inner surface 10 for correctly positioning the balance weight 20 in the balance weight position 22 in the first balancing plane 17.

The operator then inputs a signal to the control circuit 45 by operating another input button switch (not shown) on the support housing 30 which indicates to the microprocessor 46 that the operator now requires the balance weight position 22 for the balance weight 20 for the second balancing plane 18. The stepper motor 76 is again operated under the control of the microprocessor 46 for repositioning the laser light source 70 for indicating the balance weight position 22 in the balancing plane 18. The wheel 2 is again slowly rotated by the operator and on the balance weight position 22 in the balancing plane 18 being aligned with the laser light source 70, the laser light source 70 is powered up for directing the light beam 72 onto the inner surface 10 of the wheel 4 for indicating the balance weight position 22 in the second balancing plane 18 as already described.

The advantages of the wheel balancer according to the invention are many. However, the wheel balancer according to this embodiment of the invention achieves two particularly important advantages. Firstly, by virtue of the fact the light beam of the laser light source indicates the precise position at which each balance weight is to be secured to the wheel, balance weights can be accurately secured to alloy wheels. In other words, by virtue of the fact that the light beam of the laser light source indicates the balance weight position by a point dot of light which indicates the point of intersection of the angular centre line 21 and the inner circumferential side edge 25 of each balance weight position 22, the balance weights can be accurately positioned and secured to the wheel hub. Secondly, by virtue of the fact that the balance weight positions are indicated when the respective positions are in the lower front quadrant of the wheel relative to the wheel balancer, an operator can readily, easily and clearly see each balance weight position by merely looking downwardly at the inner surface 10 of the wheel hub 4, and furthermore, can readily, easily work at the position for accurately securing the balance weight thereto. This further facilitates accuracy of positioning of the balance weights to the wheel hub.

Referring now to FIGS. 18 to 22, there is illustrated a wheel balancer according to another embodiment of the invention which is indicated generally by the reference numeral 90. The wheel balancer 90 is substantially similar to the wheel balancer 1 and similar components are identified by the same reference numerals. The main difference between the wheel balancer 90 and the wheel balancer 1 is in the sensing means for detecting the positions of the balance weight receiving locations in the respective selected balancing planes 17 and 18. In this embodiment of the invention, the sensor arm 54 is dispensed with, and the sensing means is a non-contact sensing means, which comprises a 64×1 integrated charge coupled opto sensor 91, in this case provided by an opto sensor type TSL214 supplied by Texas Instruments and illustrated on Page 4.9 of their June 1991 catalogue, which was revised in August 1991. The opto sensor 91 co-operates with the laser light source 70 of the indicator mechanism 65 for detecting the balance weight receiving locations at the respective selected balancing planes 17 and 18, prior to running the main shaft 36 up to the desired balancing speed.

The laser light source 70 is mounted on a mounting means, namely, a mounting platform 92 which is carried on the carrier shaft 73, see FIG. 20. The laser light source 70 is co-axial with the carrier shaft 73 and is pivotal with the carrier shaft 73 about the vertical pivot axis defined by the carrier shaft 73. The stepper motor 76 under the control of the microprocessor 46 drives the carrier shaft 73 through the gears 77 and 78 for positioning the laser light source for directing the light beam 72 at the lower front quadrant 23 of the wheel hub 4 for indicating the balance weight positions 22 in the respective balancing planes 17 and 18. This is similar to the operation of the stepper motor 76 and the laser light source 70 of the wheel balancer 1. The potentiometer 80 is driven by the carrier shaft 73 through the gears 81 and 82 as is also the case in the wheel balancer 1.

In this embodiment of the invention, the carrier shaft 73 is a two part shaft having a drive part 93 and a driven part 94 which are co-axial with each other. The drive part 93 is driven by the stepper motor 76, which in turn, drives the driven part 94 through an electrically powered clutch 95 for facilitating disengagement of the mounting platform 92, the laser light source 70 and the opto sensor 91 from the stepper motor 76 for facilitating detecting of the balance weight receiving locations in the balancing planes 17 and 18, as will be described below. The potentiometer 80 is connected to the driven part 94 of the carrier shaft 73 through the gears 81 and 82 for facilitating determination of the angular orientation of the mounting platform 92 at all times.

A knob 97 carried on a shaft 98 which extends through the cover 74 from the mounting platform 92, and is rigidly connected to the mounting platform 92, is provided for facilitating manual rotation of the mounting platform 92, and in turn, the laser light source 70 for directing the light beam 72 at the balance weight receiving locations in the respective selected balancing planes 17 and 18, when the clutch 95 disconnects the mounting platform 92 from the stepper motor 76.

The opto sensor 91 is rigidly mounted on the mounting platform 92 at a location spaced apart from the laser light source 70 and is directed so that its monitoring arc 96 is arranged to monitor a length of the light beam 72 from positions X to Y, see FIG. 21, so that the opto sensor 91 detects the laser light dot formed by the light beam 72 on the inner surface 10 of the wheel hub 4 when the light beam 72 is manually directed at the selected balancing planes 17 and 18. This, as will be described below, facilitates computation by the microprocessor 46 of the respective radii of the balance weight receiving locations in the selected balancing planes 17 and 18 and the positions of the respective balancing planes 17 and 18 relative to the reference plane (not shown).

The opto sensor 91 is positioned so that the length of the light beam 72 between the reference letters X and Y monitored by the monitoring arc 96 is of sufficient length to facilitate detection of the laser light dot formed by the light beam 72 on the inner surface 10 of a wheel hub 4 at typical balancing planes 17 and 18 for wheel hubs of diameters within a relatively wide range of wheel diameter. In this embodiment of the invention, the opto sensor 91 is arranged for detecting the laser light dot of the light beam 72 at the respective balancing planes 17 and 18 on the inner surfaces of wheel hubs of wheels of nominal diameter in the range of 250 mm to 500 mm, and thus, the wheel balancer is particularly suitable for use with motor car wheels. Needless to say, the opto sensor and the laser light source could be arranged for use with larger diameter wheels, such as, for example, truck and bus wheels and the like, which would be of nominal diameter in the range from 380 mm to 620 mm, and indeed, larger, and indeed, it is envisaged in certain cases the opto sensor and the laser light source could be arranged to cope with a significantly wider range of nominal diameters of wheels.

The opto sensor 91 is electrically connected to the control circuit 45, and in turn to the microprocessor 46, so that the microprocessor 46 reads signals from the opto sensor 91 which are generated in response to the opto sensor 91 detecting the laser light dot on the inner surface 10 of a wheel hub 4 mounted on the main shaft 36, and the position of the light dot between the positions X and Y. By knowing the angle through which the mounting platform 92, and in turn, the laser light source 70 are rotated for directing the light beam 72 to the balance weight receiving location at the selected balancing plane 17 or 18, and the position of the light dot formed by the light beam 72 between the positions X and Y, the microprocessor 46 can readily compute the position of the selected balancing plane 17 or 18 relative to the reference plane (not shown) along the rotational axis 38 of the main shaft 36, and the radius of the balance weight receiving location at the selected balancing plane 17 or 18.

In use, with a wheel 2 mounted on the main shaft 36, the selected positions of the respective balancing planes 17 and 18 are detected by the opto sensor 91 as will now be described. With the clutch 95 disengaging the mounting platform 92 from the stepper motor 96, and with the laser light source 70 powered up, the operator rotates the knob 97 thereby rotating the mounting platform 92 and the laser light source 70 until the light beam 72 from the laser light source 70 forms a laser light dot on the inner surface 10 at a position which coincides with one of the selected balancing planes 17 and 18. The laser light dot is detected by the opto sensor 91 which outputs a signal proportional to the distance of the dot from the position X on the light beam 72. When the laser light dot is formed on the inner surface 10 of the wheel hub 4 at the location of the selected balancing plane, a signal is inputted by the operator to the control circuit 45 through a button switch (not shown) on the housing 30. In response to the inputted signal, the microprocessor 46 reads the signal outputted by the opto sensor 91 and the signal outputted by the potentiometer 80. With these two signals the microprocessor 46 determines the radius of the balance weight receiving location on the inner surface 10 of the wheel hub 4 at the selected balancing plane 17 or 18, and also the distance of the selected balancing plane 17 or 18 from the reference plane (not shown) along the rotational axis 38 of the main shaft 36.

After the position of the first of the two balancing planes 17 and 18 and the radius of the balance weight receiving location at the selected balancing plane have been determined, the operator again rotates the knob 97 for directing the light beam 72 from the laser light source 70 to form a laser light dot on the inner surface 10 of the wheel hub 4 in the position of the other of the two selected balancing planes 17 and 18. When the laser light dot is formed in the desired location, the operator inputs a signal to the control circuit 45 as already described through the button switch (not shown) on the support housing 30. In the manner already described, the microprocessor 46 again computes the radius of the second balance weight receiving location in the second selected balancing plane and the distance of the second selected balancing plane along the rotational axis 38 of the main shaft 36 from the reference plane (not shown).

The wheel balancer 90 is then operated for determining the magnitude of the correcting balance weights required and the angular position of the balance weight positions 22 in the respective selected balancing planes 17 and 18 in similar fashion as the wheel balancer 1.

When the angular positions of the balance weight positions 22 and the magnitude of the respective balance weights 20 have been computed, the clutch 95 is powered for transmitting drive between the drive part 93 and the driven part 94 of the carrier shaft 73, and the stepper motor 76 is operated as already described with reference to the wheel balancer 1 for aligning the laser light source 70 with one of the balance weight positions 22. The operator then slowly rotates the wheel 2 by hand, and when one of the balance weight positions 22 is in the lower front quadrant 23 and aligned with the laser light source 70, the laser light source 70 is powered up for directing the light beam 72 at the inner surface 10 of the wheel hub 4 for indicating the balance weight position 22 as already described. The two balance weight positions 22 are indicated in this fashion, and the operator attaches the appropriate balance weights 20 to the respective balance weight positions 22 as already described with reference to the wheel balancer 1.

It will of course be appreciated that the wheel balancers as well as being suitable for balancing alloy wheels which are to be balanced with self-adhesive stick-on weights, may also be used for balancing conventional wheels which are balanced with clip-on weights, which are in general, clipped to the inner and outer rims of the wheel hub. In which case, it is envisaged that the sensor arm or the opto sensor would be used for detecting the position and radius of the balance weight location in the inner balancing plane, and the position of the outer balancing plane would be entered into the control circuit of the wheel balancer through a keyboard on the wheel balancer, or by means of a touch screen, or any other suitable entry means. The position of the balance weight position on the outer rim could be indicated conventionally when the balance weight position is at top dead centre of the wheel. It is also envisaged that the wheel balancers may be used for balancing a wheel which requires a combination of stick-on and clip-on balance weights.

It will be appreciated that in all cases it is not essential that the position indicating means should indicate the balance weight position when the balance weight position is in the lower front quadrant of the wheel, although, this is advantageous. In certain cases, the balance weight position may be in an upper quadrant of the wheel when it is being indicated. It is, however, preferable that the balance weight position when it is being indicated should be in a position which is accessible both visually and manually to the operator, when the operator is standing to the front of the wheel balancer in a normal operating position, without the need for the operator having to bend down, and look upwardly for the purpose of identifying the balance weight position.

What is claimed is:

1. A wheel balancer (1) for measuring imbalance in a vehicle wheel (2) in a balancing plane (17,18) normal to the axis (38) of rotation of the vehicle wheel (2), and for indicating the position (22) on the wheel (2) at which a balance weight (20) is to be located for correcting the imbalance, the wheel balancer (1) comprising a support means (30), a main shaft (36) rotatable about a rotational axis (38) in the support means (30), a receiving means (39) located on the main shaft (36) for receiving the vehicle wheel (2) with the axis of rotation of the vehicle wheel (2) co-axial with the rotational axis (38) of the main shaft (36), a sensing means (53,91) for detecting the balancing plane (17,18) of the vehicle wheel (2) and a balance weight receiving location (10) adjacent the balancing plane (17,18), and for generating signals representative of the position of the balancing plane (17,18) along the rotational axis (38) relative to a reference plane and the radius of the balance weight receiving location (10) adjacent the balancing plane (17,18), a monitoring means (41,44) for monitoring rotation of the main shaft (36) and for generating signals representative of the magnitude and angular direction of imbalance forces in the main shaft (36), a computing means (45,46) for computing the magnitude of a correcting balance weight (20) and the angular position of the balance weight (20) to be located at the balance weight receiving location (10) in the balancing plane (17,18) for correcting the imbalance in response to signals generated by the sensing means (53,91) and the monitoring means (41,44), and a position indicating means (70,72) responsive to the computing means (45,46) for indicating the angular position relative to the wheel axis at which the correcting balance weight (20) is to be located, characterized in that the position indicating means (70,72) indicates a balance weight position (22) in the balance weight receiving location (10) adjacent the balancing plane (17,18) at which the correcting balance weight (20) is to be located, the angular position of the balance weight position (22) and its position relative to the reference plane being indicated by the position indicating means (70,72), and the position indicating means (70,72) indicates the balance weight position (22) by means of a visually perceptible indication (86) on the wheel (2).

2. A wheel balancer as claimed in claim 1 characterized in that the indicating means (70,72) is adapted for indicating the balance weight position (22) when the wheel (2) is in a rotational position such that the balance weight position (22) is located in a position which is accessible to the operator.

3. A wheel balancer as claimed in claim 1 characterized in that the rotational axis (38) defined by the main shaft (36) extends horizontally, and the position indicating means (70,72) is adapted for indicating the balance weight position (22) when the balance weight position (22) is located in a lower half of the wheel (22) relative to the main shaft (36).

4. A wheel balancer as claimed in claim 3 characterized in that the support means (30) defines a front face (31), a rear face (32) and a side face (34) of the wheel balancer (1), the side face (34) extending between the front face (31) and the rear face (32) thereof, and the main shaft (36) extending outwardly from the side face (34) of the support means between the front and rear faces (31,32), so that in use an operator normally operates the wheel balancer (1) from a position in front of the front face (31) thereof, and the position indicating means (70,72) indicates the balance weight position (22) when the balance weight position (22) is located in a lower front quadrant (23) of the wheel (2) relative to the main shaft (36) and the support means (30).

5. A wheel balancer as claimed in claim 3 characterized in that the support means (30) and the main shaft (36) are located relative to each other for providing easy access by an operator to the balance weight position (22) when the balance weight position (22) is indicated by the position indicating means (70,72).

6. A wheel balancer as claimed in claim 3 characterized in that the position indicating means (70,72) is adapted for indicating the balance weight position (22) when the balance weight position (22) lies in a position at an angle in the range of ±30° to ±80° from bottom dead centre of the wheel (2).

7. A wheel balancer as claimed in claim 6 characterized in that the position indicating means (70,72) is adapted for indicating the balance weight position (22) when the balance weight position (22) lies in a position at an angle in the range of ±57° to ±71° from bottom dead centre of the wheel (2).

8. A wheel balancer as claimed in claim 1 characterized in that the position indicating means (70,72) is a non-contact indicating means (70,72) indicates the center line (21) of the balance weight position (22) parallel to the rotational axis (38) of the main shaft (36), and a circumferential side edge (25) of the balance weight position (22).

9. A wheel balancer as claimed in claim 8 characterized in that the position indicating means (70,72) indicates the circumferential side edge (25) of the balance weight position (22) which is adjacent the support means (30).

10. A wheel balancer as claimed in claim 1 characterized in that the position indicating means (22) indicates two balance weight positions (22) on the wheel (2) adjacent respective axially spaced apart balancing planes (17,18) for dynamic balancing of the wheel (2).

11. A wheel balancer as claimed in claim 1 characterized in that the position indicating means (70,72) is a non-contact indicating means (70,72).

12. A wheel balancer as claimed in claim 11 characterized in that the light source (70) projects a dot (86) of light onto the balance weight receiving location (10) for indicating each balance weight position (22), and the light source (70,72) is powered up to project the light beam (72) only when the wheel (2) has been rotated into a position with the respective balance weight positions (22) located in the position which is accessible to the operator, and the light source (70,72) only remains powered up to project the light beam (72) for so long as each balance weight position (22) remains located in the position which is accessible to the operator.

13. A wheel balancer as claimed in claim 11 characterized in that the position indicating means (70,72) is pivotally mounted for pivoting in a single plane for sweeping the light beam (72) through an arc in a horizontal plane below the main shaft (36) for indicating each balance weight position (22), and a drive means (40) is provided for pivoting the position indicating means (70,72) in the single plane about a vertically extending pivot axis in response to the computing means (45,46).

14. A wheel balancer as claimed in claim 13 characterized in that the position indicating means (70,72) is mounted towards the rear face (32) of the support means (30) between a vertical plane containing the rotational axis (38) of the main shaft (36) and the rear face (32) of the support means (30) and the position indicating means (70,72) directs the light beam (72) outwardly of the side face (34) of the support means (30) in a generally sideward forward direction relative to the support means (30).

15. A wheel balancer as claimed in claim 11 characterized in that the sensing means (91) is a non-contact sensing means (91) and co-operates with the position indicating means (70) for detecting each balancing plane (17,18) of the vehicle wheel (2) and the balance weight receiving location (10) adjacent each balancing plane (17,18), the position indicating means (70,72) being movable for directing the light beam (72) at the wheel (2) so that the beam (72) strikes the wheel (2) at the balance weight receiving location (10) adjacent each balancing plane (17,18), so that a dot of light from the light beam (72) projected onto each balance weight receiving location (10) is detectable by the sensing means (91), and a feedback means (80) is provided for feeding back to the computing means (45,46) signals representative of the position of the position indicating means (70) when the beam (72) strikes the wheel (2) at the balance weight receiving location (10) in each balancing plane (17,18), so that the combination of signals generated by the sensing means (91) and the feedback means (80) are representative of the position of each balancing plane (17,18) along the rotational axis (38) relative to the reference plane and the radius of the balance weight receiving location (10) adjacent each balancing plane (17,18).

16. A wheel balancer as claimed in claim 15 characterized in that the position indicating means (70,72) and the sensing means (91) are mounted at spaced apart locations on a mounting means (92), the mounting means (92) being movable for moving the position indicating means (70,72) for directing the beam (72) to the wheel (2) at the balance weight receiving location (10) in each balancing plane (17,18) for facilitating detecting of the balance weight receiving location (10) in each balancing plane (17,18) by the sensing means (91).

17. A wheel balancer as claimed in claim 16 characterized in that the sensing means (91) is a charge coupled integrated opto sensor (91), and is mounted on the mounting means (92) for scanning an arc on the wheel (2) adjacent the balance weight receiving location (10) adjacent each balancing plane (17,18), the position indicating means (70,72) being mounted on the mounting means (92) for directing the beam (72) to strike the wheel (2) within the arc scanned by the sensing means (91) for facilitating detection of the balance weight receiving location (10) in each balancing plane (17,18) by the sensing means (91).

18. A wheel balancer as claimed in claim 11 characterized in that the position indicating means (70,72) comprises a light source (70) which projects a pencil light beam (72) for indicating each balance weight position (22).

19. A wheel balancer as claimed in claim 1 characterized in that the sensing means (53) is a contact sensing means (54).

20. A wheel balancer as claimed in claim 19 characterized in that the sensing means (53) comprises an extendible sensor arm (54) which is connected to the support means (30) and is extendible for engaging the wheel (2) adjacent the balance weight receiving location (10) adjacent each balancing plane (17,18).

21. A wheel balancer as claimed in claim 1 characterized in that the position indicating means (70,72) indicates each balance weight position (22) on an inner surface (10) of a wheel hub (4) of the wheel (2) which defines a wheel well (15).

22. A wheel balancer as claimed in claim 21 characterized in that the wheel balancer (1) is adapted for balancing an alloy wheel (2) in which the wheel hub (4) is an alloy wheel hub (4).

23. A wheel balancer as claimed in claim 21 characterized in that the position indicating means (70,72) indicates each balance weight position (22) in the wheel well (15) at a location which lies axially between an inner rim (7) of the wheel hub (4) and spokes (11) of the wheel hub (4).

24. A wheel balancer as claimed in claim 1 characterized in that the indicating means (70,72) is adapted for indicating the balance weight position (22) when the rotational position of the wheel (2) is such that the balance weight position (22) is located in a position which is visually accessible to the operator.

25. A method using a wheel balancer (1) for measuring imbalance in a vehicle wheel (2) in a balancing plane (17,18) normal to the axis of rotation of the vehicle wheel (2), the method comprising the steps of attaching the vehicle wheel (2) to a receiving means (39) which is located on a main shaft (36) of the wheel balancer (1), which in turn is rotatably supported in a support means (30), the axis of rotation of the vehicle wheel (2) coinciding with the rotational axis (38) of the main shaft (36), detecting by means of a sensing means (53,91) of the wheel balancer (1) the balancing plane (17,18) and a balance weight receiving location (10) adjacent the balancing plane (17,18) at which a correcting balance weight (20) is to be attached, and generating signals by the sensing means (53,91) which are representative of the position of the balancing plane (17,18) along the rotational axis (38) of the main shaft (36) relative to a reference plane and the radius of the balance weight receiving location (10), monitoring rotation of the main shaft (36) by a monitoring means (41,44), and generating signals by the monitoring means (41,44) which are representative of the magnitude and angular direction of the imbalance forces in the main shaft (36), computing by means of a computing means (45,46) from signals received from the sensing means (53,91) and the monitoring means (41,44) the magnitude of a correcting balance weight (20) and the angular position at which the balance weight (20) is to be located at the balance weight receiving location (10) adjacent the balancing plane (17,18) for correcting the imbalance, and indicating by means of a position indicating means (70,72) in response to signals received from the computing means (45,46) the angular position at which the correcting balance weight (20) is to be located, characterized in that a balance weight position (22) in the balance weight receiving location (10) adjacent the balancing plane (17,18) is indicated by the position indicating means (70,72), the angular position of the balance weight position (22) and its position relative to the reference plane being indicated by the position indicating means (70,72), and the balance weight position (22) is indicated by the position indicating means (70,72) by means of a visually perceptible indication (86) on the wheel (2).

26. A method as claimed in claim 25 characterized in that the method comprises the step of indicating the balance weight position (22) by the position indicating means (70, 72) when the wheel (2) is in a rotational position such that the balance weight position (22) is located in a visually accessible position to the operator of the wheel balancer (1).

27. A method as claimed in claim 26 characterized in that the method comprises the step of indicating the balance weight position (22) by the position indicating means (70, 72) when the balance weight position (22) is located facing upwardly rearwardly relative to the support means (30) of the wheel balancer (1).

* * * * *